US009675101B2

(12) United States Patent
Conti et al.

(10) Patent No.: US 9,675,101 B2
(45) Date of Patent: Jun. 13, 2017

(54) HIGH PERFORMANCE ADJUSTABLE JUICER WITH WHOLE FOODS FEED CHUTE

(71) Applicant: Whirlpool Corporation, Benton Harbor, MI (US)

(72) Inventors: Michael P. Conti, St. Joseph, MI (US); Everett Sidney Kettle, Portage, MI (US); Zachary A. Lownds, St. Joseph, MI (US); Leif A. Norland, St. Joseph, MI (US); Mitchell L. Robertson, Elkhart, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 496 days.

(21) Appl. No.: 14/210,770

(22) Filed: Mar. 14, 2014

(65) Prior Publication Data

US 2014/0261019 A1     Sep. 18, 2014

Related U.S. Application Data

(60) Provisional application No. 61/792,945, filed on Mar. 15, 2013.

(51) Int. Cl.
    *A23N 1/02*         (2006.01)
    *A47J 19/02*       (2006.01)
    *A47J 43/06*       (2006.01)

(52) U.S. Cl.
    CPC .............. *A23N 1/02* (2013.01); *A47J 19/02* (2013.01); *A47J 43/06* (2013.01)

(58) Field of Classification Search
    CPC .............. A23N 1/02; A47J 19/02; A47J 43/00
(Continued)

(56) References Cited

U.S. PATENT DOCUMENTS

| 1,906,054 A | 4/1933 | Freese |
| 1,995,670 A | 3/1935 | Crowe |
(Continued)

FOREIGN PATENT DOCUMENTS

| CN | 201530138 U | 7/2010 |
| CN | 101889815 A | 11/2010 |
(Continued)

OTHER PUBLICATIONS

European Patent Application No. 14158633.9 filed Mar. 10, 2014, Applicant: Whirlpool Corporation, European Search Report re: Same, mail date: Jul. 8, 2014.
(Continued)

*Primary Examiner* — Mark Paschall
(74) *Attorney, Agent, or Firm* — Price Heneveld LLP

(57) ABSTRACT

A juicing system with a drive mechanism and a juicer assembly, where the juicer assembly includes a main housing defining a cavity. A lid encloses a top portion of the cavity and has an opening therethrough. An auger is disposed within the cavity and has a top portion and a bottom portion. The auger is operably connected at one of the top portion or the bottom portion to the drive mechanism to rotate the auger. A rotatable cutting blade is disposed at the top portion of the auger. The rotatable cutting blade cuts foods inserted into the cavity through the opening. A juicing basket is disposed within the cavity, radially outwardly from the auger. The juicing basket has at least one screen with apertures therethrough of varying sizes. Food is pressed by the auger against the juicing basket to squeeze juice and pulp through the apertures.

8 Claims, 26 Drawing Sheets

(58) Field of Classification Search
USPC .................................................. 99/511–513
See application file for complete search history.

(56) References Cited

U.S. PATENT DOCUMENTS

| | | | |
|---|---|---|---|
| 2,121,622 A | 6/1938 | Bean | |
| 2,144,390 A | 1/1939 | Rupert et al. | |
| 2,176,379 A | 10/1939 | Gundelfinger | |
| 2,436,064 A | 2/1948 | Crosby | |
| 2,644,393 A | 7/1953 | Harden | |
| 2,660,211 A | 11/1953 | Berglind | |
| 3,352,339 A | 11/1967 | Moline | |
| 3,566,939 A | 3/1971 | Hubrich | |
| 3,623,523 A | 11/1971 | Myer | |
| 3,741,104 A | 6/1973 | Kannegiesser | |
| 3,761,668 A | 9/1973 | Harnden et al. | |
| 3,966,607 A | 6/1976 | Gaynor et al. | |
| 4,106,401 A | 8/1978 | Ackeret | |
| 4,125,064 A | 11/1978 | Ackeret | |
| 4,157,062 A | 6/1979 | Ackeret | |
| 4,183,293 A | 1/1980 | Arao et al. | |
| 4,363,265 A | 12/1982 | Tanioka et al. | |
| 4,385,553 A | 5/1983 | Ihara et al. | |
| 4,506,601 A | 3/1985 | Ramirez | |
| 4,518,621 A | 5/1985 | Alexander | |
| 4,670,281 A | 6/1987 | Bradley | |
| 4,688,478 A | 8/1987 | Williams | |
| 4,774,097 A | 9/1988 | Bushman et al. | |
| 4,915,709 A | 4/1990 | Andrew et al. | |
| 4,973,485 A * | 11/1990 | Rich | A23L 27/13 |
| | | | 426/387 |
| 5,156,872 A | 10/1992 | Lee | |
| 5,193,447 A | 3/1993 | Lucas et al. | |
| 5,289,763 A | 3/1994 | Lerouzic et al. | |
| 5,355,784 A | 10/1994 | Franklin et al. | |
| 5,381,730 A | 1/1995 | Kim | |
| 5,396,836 A | 3/1995 | Kim | |
| 5,144,775 A | 5/1995 | Wilson | |
| 5,433,144 A | 7/1995 | Lee | |
| 5,445,069 A | 8/1995 | Lucas et al. | |
| 5,452,650 A | 9/1995 | Lee | |
| 5,588,496 A | 12/1996 | Elger | |
| 5,598,772 A | 2/1997 | Catelli | |
| 5,601,690 A | 2/1997 | Gauld et al. | |
| 5,743,176 A * | 4/1998 | Anderson | A23N 1/00 |
| | | | 99/512 |
| 6,050,180 A | 4/2000 | Moline | |
| 6,142,905 A | 11/2000 | Brown et al. | |
| D470,368 S | 2/2003 | Kim | |
| 6,637,323 B2 | 10/2003 | Kim | |
| 6,668,709 B1 | 12/2003 | Vilana et al. | |
| 6,854,382 B2 | 2/2005 | Jan | |
| 6,861,004 B2 | 3/2005 | Benenson et al. | |
| 7,040,220 B1 | 5/2006 | Cohen et al. | |
| 7,044,051 B2 | 5/2006 | Lerouzic | |
| 7,059,763 B2 | 6/2006 | Sordelli et al. | |
| D526,846 S | 8/2006 | Kim | |
| 7,160,023 B2 | 1/2007 | Freude et al. | |
| 7,644,656 B2 | 1/2010 | Esteve | |
| 7,648,049 B1 | 1/2010 | Lassota | |
| D643,265 S | 8/2011 | Kim | |
| 8,091,473 B2 | 1/2012 | Kim | |
| 8,161,872 B2 | 4/2012 | Rivera | |
| 8,863,656 B2 * | 10/2014 | Trovinger | A23N 1/02 |
| | | | 100/117 |
| 9,167,938 B2 * | 10/2015 | Benoit | A47J 43/0705 |
| 9,220,373 B2 * | 12/2015 | Hensel | A47J 19/02 |
| 9,357,869 B2 * | 6/2016 | Sauer | A47J 19/025 |
| 2005/0081723 A1 | 4/2005 | Lin | |
| 2005/0193896 A1 | 9/2005 | McGill | |
| 2006/0169152 A1 | 8/2006 | Lin et al. | |
| 2007/0277682 A1 | 12/2007 | Wong | |
| 2008/0226803 A1 | 9/2008 | Letourneau et al. | |
| 2009/0229478 A1 | 9/2009 | Wu | |
| 2009/0272280 A1 | 11/2009 | Cheung et al. | |
| 2009/0301318 A1 | 12/2009 | Torrisi et al. | |
| 2010/0058941 A1 | 3/2010 | Rivera | |
| 2011/0083566 A1 | 4/2011 | Backus | |
| 2012/0055351 A1 | 3/2012 | Wo | |
| 2012/0080244 A1 | 4/2012 | Hou | |
| 2012/0137899 A1 | 6/2012 | Kim | |
| 2013/0074707 A1 | 3/2013 | Asbury et al. | |
| 2013/0074708 A1 * | 3/2013 | Asbury | A23N 1/02 |
| | | | 99/513 |
| 2013/0220764 A1 | 8/2013 | Choi et al. | |

FOREIGN PATENT DOCUMENTS

| | | |
|---|---|---|
| CN | 201617641 U | 11/2010 |
| CN | 201734478 U | 2/2011 |
| CN | 201752329 U | 3/2011 |
| CN | 201767733 U | 3/2011 |
| CN | 201806487 U | 4/2011 |
| CN | 201879425 U | 6/2011 |
| CN | 201911854 U | 8/2011 |
| CN | 201977518 U | 9/2011 |
| CN | 202020270 U | 11/2011 |
| CN | 202051496 U | 11/2011 |
| CN | 202060558 U | 12/2011 |
| CN | 102342735 A | 2/2012 |
| CN | 202146194 U | 2/2012 |
| CN | 202355273 U | 8/2012 |
| DE | 971304 C | 1/1959 |
| DE | 1098171 B1 | 1/1961 |
| EP | 2326220 B1 | 6/2011 |
| EP | 2651268 A | 6/2012 |
| EP | 2497393 A1 | 9/2012 |
| FR | 2839255 A1 | 11/2003 |
| FR | 2859617 A1 | 3/2005 |
| GB | 664634 | 1/1952 |
| GB | 670543 | 4/1952 |
| GB | 2041727 A | 9/1980 |
| GB | 2465834 A | 6/2010 |
| KR | 639924 B1 | 10/2003 |
| KR | 205079839 A | 8/2005 |
| KR | 2005100273 A | 10/2005 |
| KR | 2007066720 A | 6/2007 |
| KR | 438457 Y1 | 2/2008 |
| KR | 438458 Y1 | 2/2008 |
| KR | 848674 B1 | 7/2008 |
| KR | 2010042849 A | 4/2010 |
| KR | 966607 B1 | 6/2010 |
| KR | 966608 B1 | 6/2010 |
| KR | 451698 Y1 | 1/2011 |
| KR | 1007260 B1 | 1/2011 |
| KR | 1013504 B1 | 2/2011 |
| KR | 201101759 U | 2/2011 |
| KR | 2011040803 A | 4/2011 |
| KR | 2011138107 A | 12/2011 |
| KR | 2011138108 A | 12/2011 |
| KR | 2011138572 A | 12/2011 |
| KR | 2012012038 A | 2/2012 |
| KR | 2012012039 A | 2/2012 |
| KR | 2012012040 A | 2/2012 |
| KR | 2012014348 A | 2/2012 |
| KR | 2012014352 A | 2/2012 |
| KR | 2012016532 A | 2/2012 |
| KR | 2012137899 A | 12/2012 |
| WO | 0074502 A1 | 12/2000 |
| WO | 03077717 A1 | 9/2003 |
| WO | 2005016898 A1 | 2/2005 |
| WO | 2010063956 A1 | 6/2010 |
| WO | 2011025227 A2 | 3/2011 |
| WO | 2011050619 A1 | 5/2011 |
| WO | 201110350 A2 | 9/2011 |
| WO | 2012080244 A1 | 6/2012 |
| WO | 2012165713 A1 | 6/2012 |
| WO | 2013185677 A1 | 12/2013 |

OTHER PUBLICATIONS

European Patent Application No. 14160283.9 filed Mar. 17, 2014, Applicant: Whirlpool Corporation, European Search Report re: Same, mail date May 15, 2014.

(56) References Cited

OTHER PUBLICATIONS

European Patent Application No. 14160280.5 filed Mar. 17, 2014, Applicant: Whirlpool Corporation, European Search Report re: Same, mail date May 15, 2014.

* cited by examiner

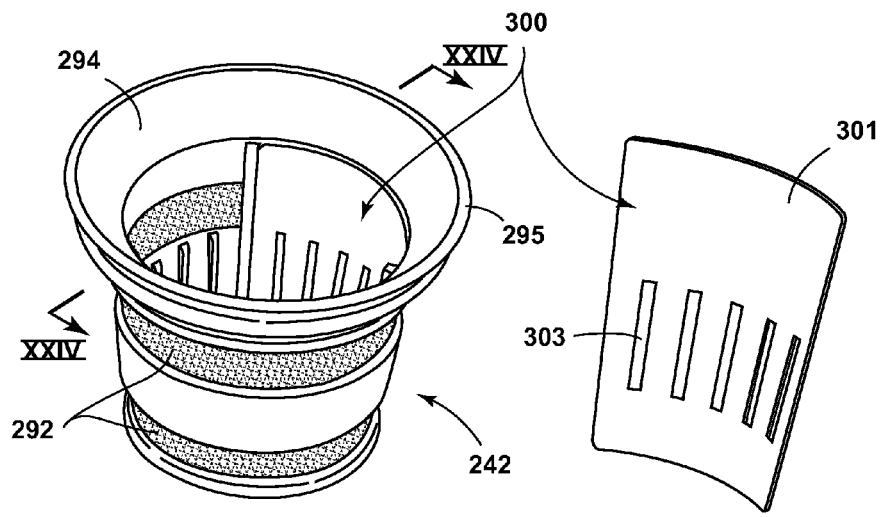
FIG. 23
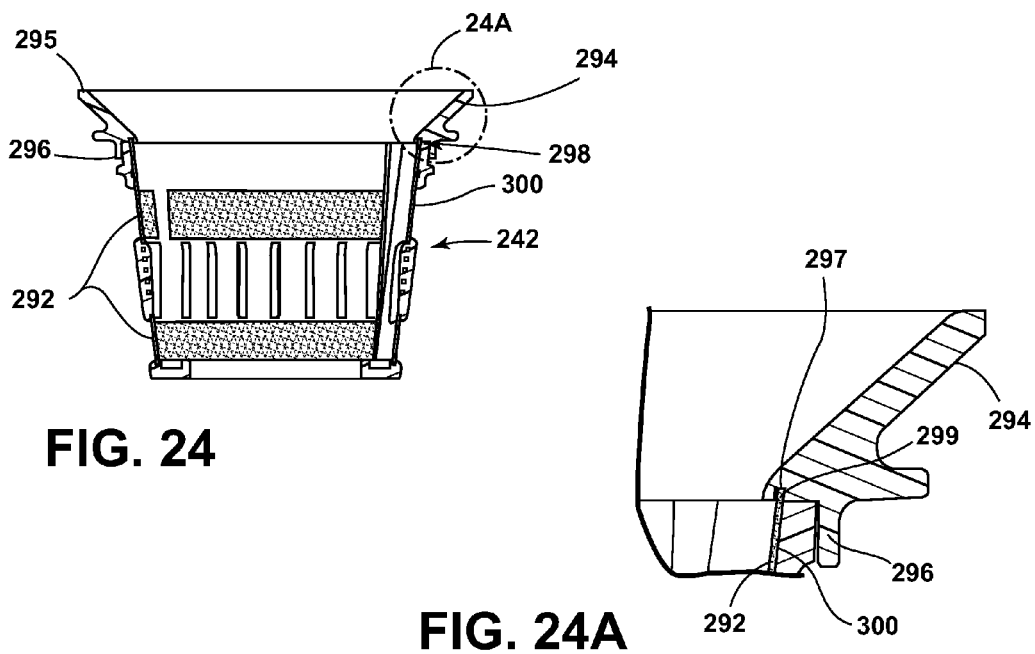
FIG. 24
FIG. 24A

HIGH PERFORMANCE ADJUSTABLE JUICER WITH WHOLE FOODS FEED CHUTE

RELATED APPLICATIONS

This application claims priority to and the benefit under 35 U.S.C. §119(e) of U.S. Provisional Patent Application No. 61/792,945, filed Mar. 15, 2013, entitled "HIGH PERFORMANCE ADJUSTABLE JUICER WITH WHOLE FOODS FEED CHUTE AND OVERLOAD CLUTCH DRIVE MECHANISM," and under 35 U.S.C. §120 of U.S. patent application Ser. No. 14/210,658, filed Mar. 14, 2014, entitled "HIGH PERFORMANCE ADJUSTABLE JUICER WITH WHOLE FOODS FEED CHUTE AND CLUTCH MECHANISM," which are hereby incorporated herein by reference in their entirety.

TECHNICAL FIELD

This patent application generally relates to a juicing system for obtaining the juice from foods.

BACKGROUND

A typical household juicing device generally requires pre-processing of the food prior to introduction into the juicer to reduce the size and shape of the food to be juiced. These juicing devices generally do not lend themselves to processing whole or uncut foods (such as a kiwi fruit) due to the smaller mouth feed chutes and a lack of torque to handle tougher foods. Additionally, existing household juicing devices often come with multiple juicing baskets that require manual interchanging in order to provide for a selected pulp size. Lastly, food overloading of these juicers, due to too much pulp or fibrous material, can cause internal rotating assembly mechanisms (such as wiper arms and crushing heads or augers) to seize, or housing parts (such as lids) to come off or become damaged, causing leakage due to the high juicing pressure.

Therefore, there is a need in the small appliance art for an efficient and compact high performance adjustable juicer configured to process small whole foods (such as, but not limited to, kiwi or small apple) without the need to pre-cut them into smaller chunks, while reducing or preventing an overload condition on the drive motor.

SUMMARY

One aspect of the present disclosure includes a juicing system having a drive mechanism and a juicer assembly. The juicer assembly includes a main housing defining a cavity. A lid encloses a top portion of the cavity and the lid has an opening therethrough which is operably connected with the cavity. An auger is disposed within the cavity and has a top portion and a bottom portion. The auger is operably connected at one of the top portion or the bottom portion to the drive mechanism to rotate the auger. A rotatable cutting blade is disposed at the top portion of the auger. The rotatable cutting blade is configured to cut foods inserted into the cavity through the opening in the lid.

Another aspect of the present disclosure includes a juicing system with a drive mechanism and a juicer assembly. The juicer assembly has a main housing defining a cavity, with a peripheral wall surrounding the cavity. A lid encloses a top portion of the cavity. The lid has an opening therethrough which is operably connected with the cavity. An auger is disposed within the cavity and aligned along a juicing axis. A juicing basket is disposed within the cavity and positioned radially outwardly from the auger and inwardly from the peripheral wall. The juicing basket has at least one screen with apertures therethrough. The apertures are of varying sizes.

Another aspect of the present disclosure includes a juicing system with a drive mechanism and a juicer assembly. The juicer assembly has a main housing defining a cavity. A lid encloses a top portion of the cavity, and the lid has an opening therethrough which is operably connected with the cavity. A feed chute is fluidly connected with the opening in the lid. The feed chute is configured to allow the introduction of whole foods into the cavity. A food pusher fits within the feed chute, and the food pusher includes a second passageway therethrough for the introduction of food items. The feed chute has a larger diameter than the second passageway. An auger is disposed within the cavity and has a top portion and a bottom portion. The auger is operably connected at one of the top portion or the bottom portion to the drive mechanism to rotate the auger along a generally vertical juicing axis. The drive mechanism is configured to transmit torque to the auger through a shaft which rotates along a horizontal axis. A rotatable cutting blade is disposed on a cutting disk at the top portion of the auger. The rotatable cutting blade is configured to cut foods inserted into the cavity through the opening in the lid.

These and other features, advantages and objects of the present device will be further understood and appreciated by those skilled in the art upon studying the following specification, claims, and appended drawings.

BRIEF DESCRIPTION OF THE DRAWINGS

FIG. 23 is a top perspective view of the juicing basket shown in FIG. 22, with a blocker plate 300 according to the present disclosure;

FIG. 24 is a side cross sectional view of the juicing basket taken along line XXIV-XXIV in FIG. 23;

FIG. 24A is an enlarged cross sectional view of the juicing basket shown in FIG. 24;

DETAILED DESCRIPTION

Figure 1:
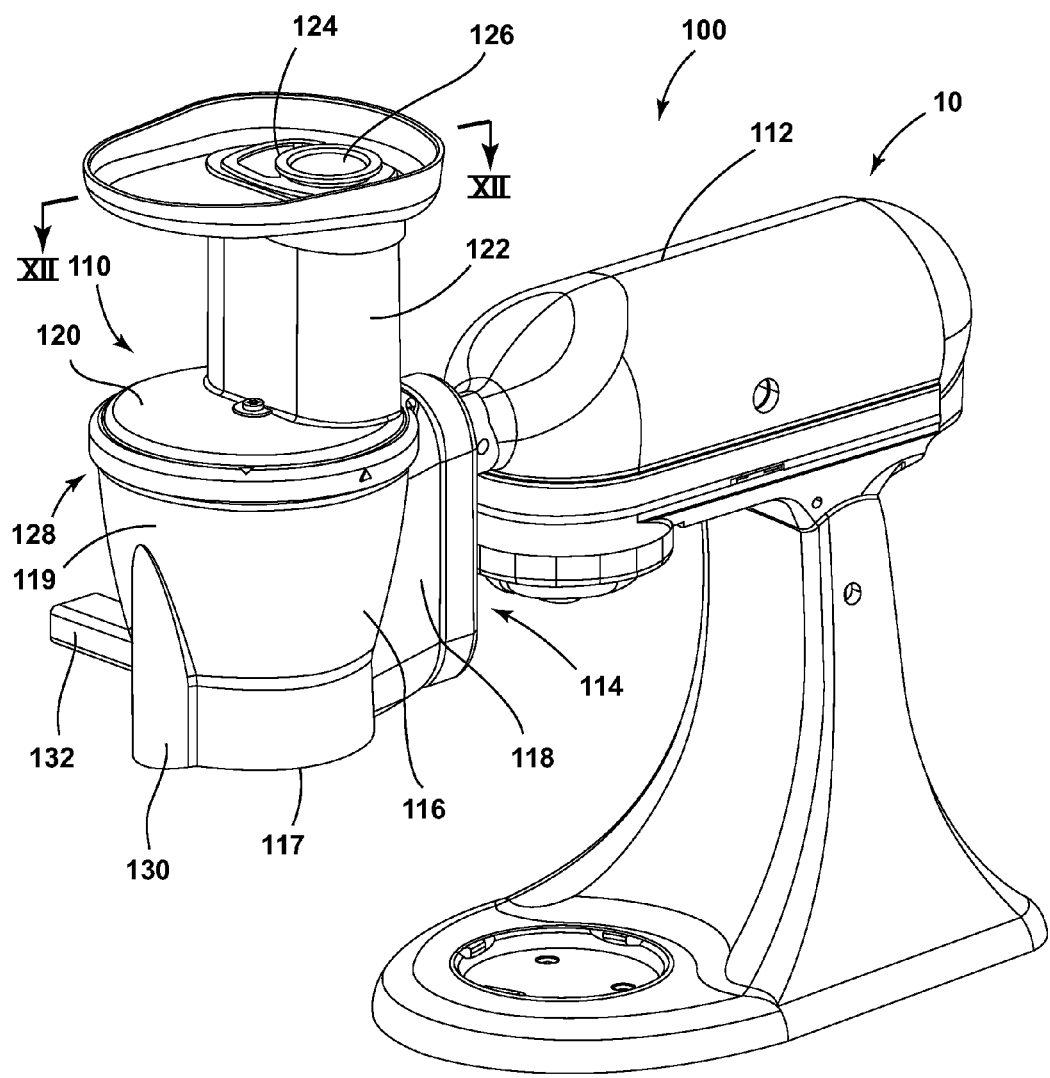
FIG. 1 is a front perspective view of one embodiment of a juicing system with a juicing drive mechanism and a juicing assembly according to the present disclosure.

Referring now to the discussion that follows and also to the drawings, illustrative approaches to the disclosed system and methods are shown in detail. Although the drawings represent some possible embodiments, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

In general, a high performance juicing system is disclosed herein. One embodiment of a juicing system, as discussed in greater detail below, includes a juicing assembly with a lid removably connected to a main housing, and a drive mechanism rotatably connected to the main housing. The lid optionally includes a multi-purpose feed chute extending through the lid and a food pusher configured to be received within the feed chute. The main housing is configured to receive the lid, and has an internal juicing cavity. The juicer assembly may include a wiper arm with integrated wiper blade.

The internal juicing cavity is configured to receive a perforated juicing basket. The juicing basket may include an adjustment mechanism for blocking at least one aperture extending through a juicing wall of the perforated juicing basket. Additionally, the juicing basket may be configured with a wide rim funnel extending about an upper circumference that defines a top portion of the juicing wall.

The internal juicing cavity is configured to receive a juicing auger. The auger is located in the housing and configured to rotate about a vertical juicing axis. The auger may include at least one cutter blade configured on a cutter disk. The juicer assembly optionally includes an overload clutch mechanism configured between the auger and the drive mechanism. The juicing assembly is configured to juice in a vertical orientation, while the drive mechanism is configured to drive in a horizontal orientation thereby requiring a mechanism, such as, but not limited to, a bevel gear, to translate the torque from the horizontal orientation to the vertical orientation.

In one alternative, the auger includes a wiper arm and is driven via a side drive mechanism with an integrated food overload clutch mechanism. The side drive mechanism includes a drive mechanism such as a belt drive pulley system or a gear drive system. Both drive mechanism alternatives can be configured to transmit power directly to a lower shaft which is configured to engage at least one of the top portion or the bottom portion of the auger. The side drive mechanism is powered by an electric outlet or other known power source used in conjunction with household appliances.

Alternatively, the overload clutch mechanism can be integrated between the side drive mechanism and the auger. In such an embodiment, a lower clutch plate includes a series of ramp features configured to engage a corresponding series of mating ramp features. The series of ramp features are mounted to a compression spring, while the mating ramp features are mounted on an adjacent surface of an upper clutch plate for a releasable or a locking connection therebetween. Thus, if a food overload condition occurs, the spring pressure against the clutch plates is exceeded and the clutch plates slip or release to remove the torque. The slippage relieves pressure and disengages the system, thereby warning the user that an overload condition has occurred and that the juicer system may need to be cleaned, the food should be fed with less force, or the amount of food introduced should be reduced.

Juicing systems according to the present disclosure can be configured to interconnect to a drive mechanism such as a stand mixer, a blender or a food processing base, or can include a stand-alone juicing unit having a juicing housing and an integrated drive mechanism.

In one embodiment, the juicing system includes a main housing containing an auger and juicing basket. A lid assembly encloses the auger and juicing basket within the main housing and includes an opening for receiving food items. An opposing and movable clutch plate is configured for selective engagement with a torque transmission unit or a power pod, and is operably connected to a drive mechanism for the auger. The auger is rotatably operably connected to the transmission unit.

In one embodiment, the juicing system includes an opposing set of mating attachment surfaces, with one on the housing and one on the power pod, where the attachment surfaces are configured to mate the main housing directly to the power pod. As illustrated and discussed in greater detail below, one embodiment includes two vertical sliding rails for sliding and locking removable engagement for quick connection or disconnection. It is contemplated that other attachment means may include a rotating lock, a positive lock device, a screw, or the like.

The juicing assembly main housing includes a juice spout and a pulp spout. In one embodiment, the juicer lid includes a feed chute, whereby the lid removably mounts atop the main housing via a turn and lock mechanism, snap-on engagement or other known securing method. A housing ring spacer may also be included to provide additional space between the lid and the main housing for the use of a cutter blade. The cutter blade is a serrated or smooth knife blade that provides a spiral cutting action. The cutter disk and cutter blade may be integrally molded with the auger or they may be removably attached to an upper surface of the auger. In this way, a food item introduced to the system first contacts the cutter disk and ultimately the cutter blade for a first stage pre-slicing of large or fibrous food items.

The lid assembly optionally includes an interlocking tab configured to engage an interlocking device. The interlocking device is configured to prevent the use of the juicing system when the lid assembly is disengaged. Additionally, in some embodiments the lid assembly includes a center bushing and a feed chute system. The lid assembly may be rotated and locked in place through at least one rotational locking engagement member configured on a rim of the lid assembly with a corresponding engagement member configured on the main housing. Thus, when the lid is rotated and locked into place, the interlocking tab is configured to act against an interlocking pin, thereby engaging the drive mechanism. The center bushing is configured to provide a centering point and is positioned in the lid about the axis of juicing. The bushing may be constructed from an oil impregnated bronze, a plastic or other known bearing type material for providing a means to capture the top of the rotating auger while allowing the auger to rotate freely. Thus, the auger may be configured to be captured at the top of the main housing by the bushing and at the bottom by a shaft or other element, thereby providing a fixed horizontal and vertical position along the vertical juicing axis, which may extend down a vertical center line of the auger.

Additionally, the feed chute optionally includes a 2-in-1 system opening. A smaller diameter opening is provided for feeding hard and fibrous foods, such as, but not limited to carrots. A larger diameter opening is provided for softer food items such as, but not limited to kiwis and oranges. In one embodiment, the larger diameter opening is in the lid and the larger diameter opening includes a food pusher, to push food through the larger diameter opening. The smaller diameter opening is optionally provided through the food pusher, such that to use the smaller diameter opening, the food pusher is placed in position in the larger diameter opening, and then foods are inserted through the smaller diameter opening.

Certain embodiments of the juicing system include a clutch mechanism configured between a juicing auger and the drive mechanism to reduce or prevent an overload condition on an adjustable speed drive motor configured in the drive mechanism. The overload condition may be a result of the juicing of whole foods, which require greater torque or compression power to extract the desired juice from the food. The auger may be removably and rotatably connected to the clutch mechanism at a first end of the auger through an auger bevel gear that is meshed with a drive gear of the drive mechanism.

Also, in certain embodiments, the clutch plate of the juicing system is mated to a transmission arranged to provide rotational torque to the auger assembly through the drive mechanism positioned along a horizontal axis. The drive mechanism is a side-drive or horizontal drive mechanism for interconnecting and transferring a horizontal rotational torque, created by the drive mechanism, to a vertical rotational juicing force along a vertical rotational juicing axis. The power pod may be integrated with at least one of the drive mechanism, the juicer unit, or a separate transmission unit.

A bevel gear is disposed on a shaft for mating with the corresponding auger bevel gear to rotate the auger. A variety of gear ratios may be employed to provide greater torque to the auger, including but not limited to a bevel gear ratio of 1:2, which results in an increased torque power at the auger. This increased power enables a user to process thick, hard or fiber-filled ingredients, such as carrot. Alternatively, the bevel gear ratios can be arranged in the form of a gear-shift transmission, so that proper speed selection can be made to match a desired function.

In some embodiments, the auger assembly includes a cutter disk and a cutter blade. The cutter disk and the cutter blade may be integrated with the auger or removable from the auger. The cutter blade may be disposed at the same end of the auger as the auger bevel gear, or on an opposite end of the auger as the auger bevel gear. The auger and cutter blade are configured for cutting and crushing whole foods to a desired juice consistency, while having the ability to externally or internally adjust the juicing pulp size. The cutter disk processes foods into smaller bits, before they pass down to the auger. This pre-processing stage helps to reduce locked-rotor conditions that may occur when large food chunks become lodged between the auger and the perforated processing screen.

The juicing basket/screen has a predetermined pattern of perforated apertures configured to allow the juice and pulp of a certain size to pass through. The perforated aperture pattern may be arranged such that the apertures increase linearly in size from a top of the basket to a bottom of the basket. This linear arrangement may be configured to coincide with a linear arrangement of a plurality of ribs on the auger, thereby providing an even juicing pressure. Additionally, in some embodiments the juicing basket includes predetermined juicing zones, which provide adjustability for determining a desired juicing and pulp size. The juicing zones may include zones with small perforations resulting in small pulp and zones with larger perforations for larger pulp. A shut-off plate system is also integrated with the juicing basket in some embodiments. The shut-off plate can be manually or electronically rotated, internally or externally to the juicing basket. Rotating the shut-off plate system over various zones of small perforations closes off a select zone only. Alternatively, rotating the shut-off plate system over the zones of larger perforations closes off this zone, thus only providing for small juice pulp extraction. It is contemplated that varying pulp size may be achieved by adjusting the shut-off plate system to partially cover both the large and small perforations may result in a varied pulp of both large and small sizes.

The auger functions to squeeze ingredients between an outside diameter of the auger, which may include the plurality of ribs, to an inside diameter of the perforated screen basket. Juice from the straining process exits out a juicing spout configured in the main housing, while pulp exits out a pulp spout. The juicing spout may be configured to allow the juice to exit either horizontally, vertically or any desired angle therebetween, relative to the juicing axis. The juicer may be configured to; at least partially, automatically eject the pulp from the pulp spout or chute that is fluidly connected to the main housing.

Additionally, a wiper arm may be configured to wipe juice and pulp from the sides of the perforated screen to direct the juice and pulp to the appropriate spout. As illustrated below, in some embodiments the wiper arm is a separate basket unit rotatably engaged with the auger. Alternatively, the wiper arm may be configured atop the cutter disk. Regardless of the configuration the wiper arm and associated basket may rotate with or against the rotation of the auger. In the illustrations, two wiper arms are shown; however the number of wiper arms could vary from a single arm to a plurality of arms. Alternatively, the wiper could be omitted from the juicer assembly. The wiper arm may positively snap, lock or may be permanently affixed with the auger for rotation in the same direction as the auger to remove the food pulp from the perforated juicing basket.

Additionally, the power pod may be configured as a universal power pod. The universal power pod may include a gear-drive transmission, a clutch plate, an interlocking device and a mounting device to accept a wide range of adaptable appliance attachments, such as, but not limited to the juicer, a food processor, a coffee grinder, a grain mill, a blender or any other known rotating attachment. The universal power pod may be configured to mount to a stand mixer or other rotational drive mechanism, which transfers rotational torque or other drive force from the stand mixer or drive mechanism to the adaptable appliance attachments. The universal power pod gear-drive transmission may include a series of gears interconnected to provide a desired gear ratio, which transmits power from an attachment hub to an output shaft.

The output may include a clutch plate configured to mate to a corresponding clutch plate configured on the adaptable appliance. A clutching mechanism may be configured between the gears in the gear-drive transmission and the clutch plate, within the adaptable appliance, or any other location configured to interrupt the drive mechanism when an overload condition is experienced, as described above. Additionally, an interlocking device may connect to or act against a sliding keyway which further engages with a main drive shaft to operate the series of gears, thereby transmitting power from the drive mechanism to the adaptable appliance.

The universal power pod may be configured with at least one mounting element. The mounting element may be configured to selectively mount the adaptable appliance thereto as needed. Thus, the universal power pod may be connected to the drive mechanism and the adaptable appliances may be interchanged with the power pod as needed for cleaning and use.

The components discussed herein are merely examples and are in no way limiting to specific arrangements as a plurality of juicing components, which will be discussed below, may be configured for ease of assembly or disassembly and clean-up of the juicer system.

Figure 2:
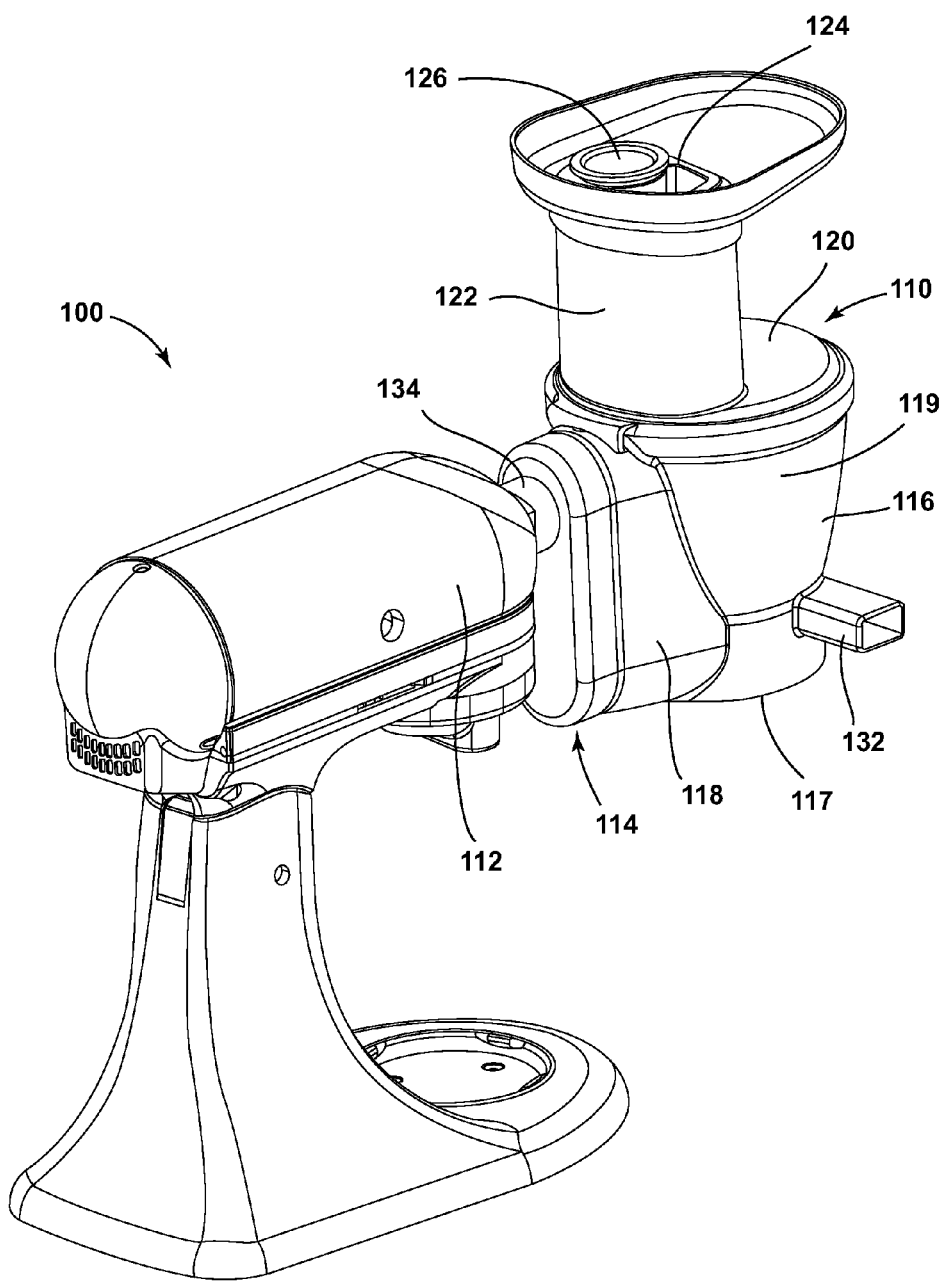
FIG. 2 is a rear perspective view of the embodiment of a juicing system shown in FIG. 1.

Specifically, with reference to FIGS. 1 and 2, one embodiment of a juicing system 100 is shown. In the embodiment depicted in FIGS. 1 and 2, a juicer assembly 110 is rotatably connected to a drive mechanism 112 through a power pod 114. In this embodiment, the drive mechanism is exemplified as a stand mixer 10. The juicer assembly 110 includes a main housing 116 having a mounting flange 118 connected to the power pod 114. The mounting flange 118 may be integrally fixed to the power pod 114 or removably connected to the power pod 114. The main housing 116 has a bottom surface 117 and a peripheral wall 119, and defines a cavity 121, as shown in the embodiment depicted in FIG. 18.

The juicer assembly 110 includes a lid 120 removably mounted to a top portion 128 of the main housing 116. The lid 120, as shown in the embodiment depicted in FIGS. 1-2, has a multi-purpose feed chute 122 configured to receive whole foods of various sizes and shapes. A pusher 124 fits within the feed chute 122. The feed chute 122 and pusher 124 are sized in order to accept whole foods without pre-cutting the foods into smaller chunks. Additionally, the feed chute 122 and pusher 124 may include a smaller passageway 126 extending through at least a portion of the pusher 124. The smaller passageway 126 may be included to allow for the introduction of foods with smaller diameters or long fibrous foods, such as carrots. The smaller passageway 126 may be used singularly or removed for introducing foods through the larger feed chute 122, depending on the foods being introduced to the juicer assembly 110.

In the embodiments depicted in FIGS. 1-7, the main housing 116 of the juicer assembly 110 includes a juice spout 130 and a pulp spout 132. The juice spout 130 is configured to allow juice 140 to exit the juicer assembly 110, after which the juice 140 is captured in a capturing container 142. The pulp spout 132 is configured to allow pulp 144 to exit the juicer assembly 110, after which the pulp 144 is captured in a pulp waste container 146. A flow or drip stop lever 136 is connected to the juice spout 130 to adjust the flow of juice 140 into the juice container 142. The lever 136 is operably connected to any known valving mechanism located in the juice spout 130, and the lever 136 is used to stop the flow of juice or adjust the flow rate of juice 140 exiting the main housing 116 through the juice spout 130.

Additionally, the main housing 116 is selectively removable from a base plate 148 configured with the power pod 114. The base plate 148 can be positioned adjacent the bottom surface 117 of the housing 116, or can constitute the bottom surface 117 of the housing 116. The removability of the main housing 116 may allow a user to disassemble the various components of the juicer assembly 110 to aid in cleaning. A lower housing 133 is optionally provided below all or part of the base plate 148, with the lower housing 133 optionally enclosing the torque transfer or drive elements. Additionally, the base plate 148 may provide an attachment point for adding alternative adaptive appliances.

Turning specifically to FIGS. 3-7, various alternative exemplary embodiments of the juicing system 100A, 100B, 100C, 100D, 100E are shown. The embodiments illustrate various non-limiting configurations for the positioning of the juice spout 130 and the pulp spout 132, as well as the lower housing 133 which optionally encloses elements of a torque transmission system when the auger 202 is driven from the bottom. Alternate configurations of the juice spout 130, pulp spout 132, and lower housing 133 are also possible.

Figure 3:
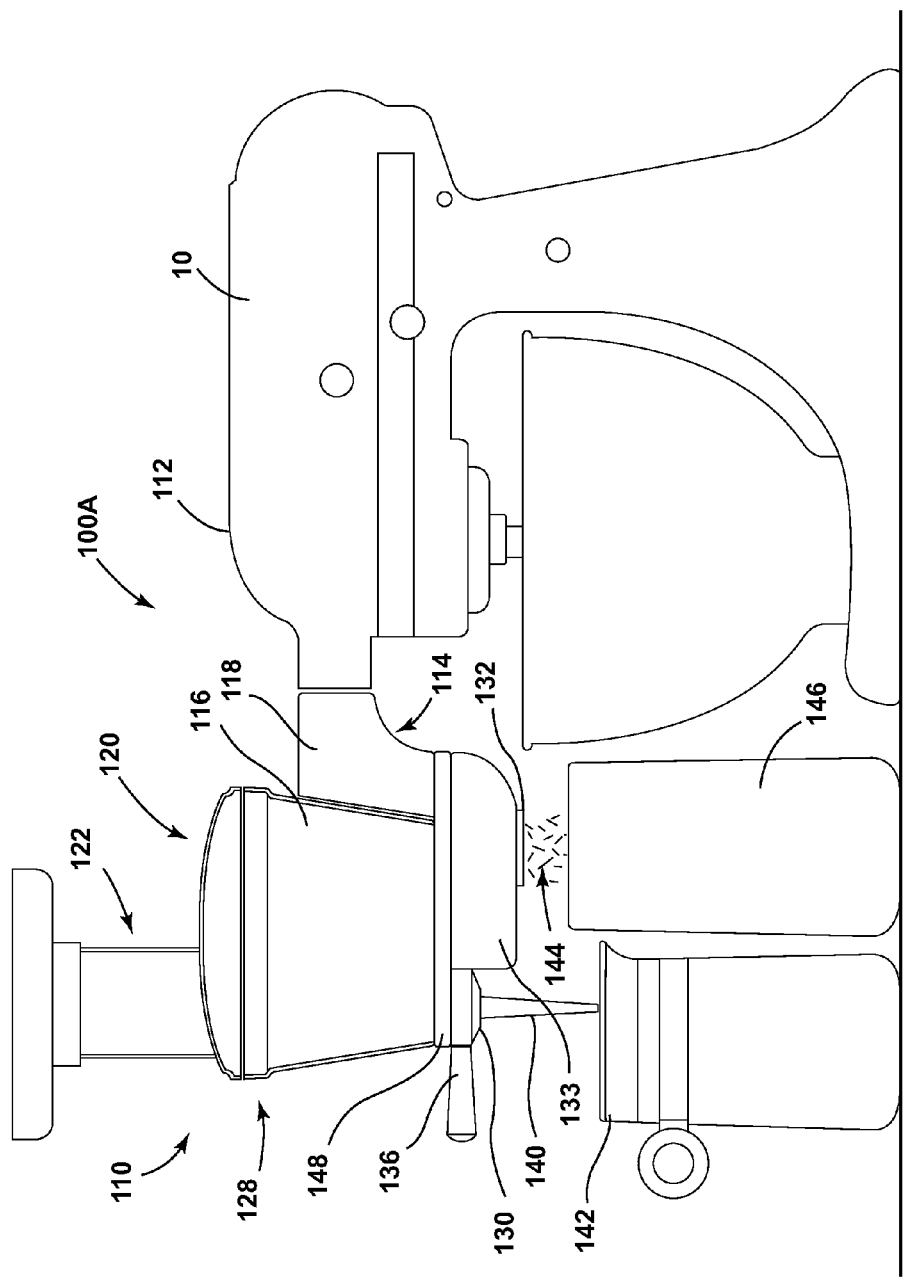
FIG. 3 is a simplified side elevation view of a juicing system according to the present disclosure.

In the embodiment of the juicing system 100A depicted in FIG. 3, the juice spout 130 and the pulp spout 132 each exit the main housing 116 through the bottom surface 117 of the housing 116, with the juice spout 130 located distally from the drive mechanism 112, and the pulp spout 132 located proximal the drive mechanism 112. The pulp spout 132 as shown in the embodiment in FIG. 3 extends through a portion of lower housing 133. In the embodiment depicted in FIG. 3, the juice spout 130 directs juice 140 into the juice container 142 and the pulp spout 132 directs pulp 144 into the pulp waste container 146.

Figure 4:
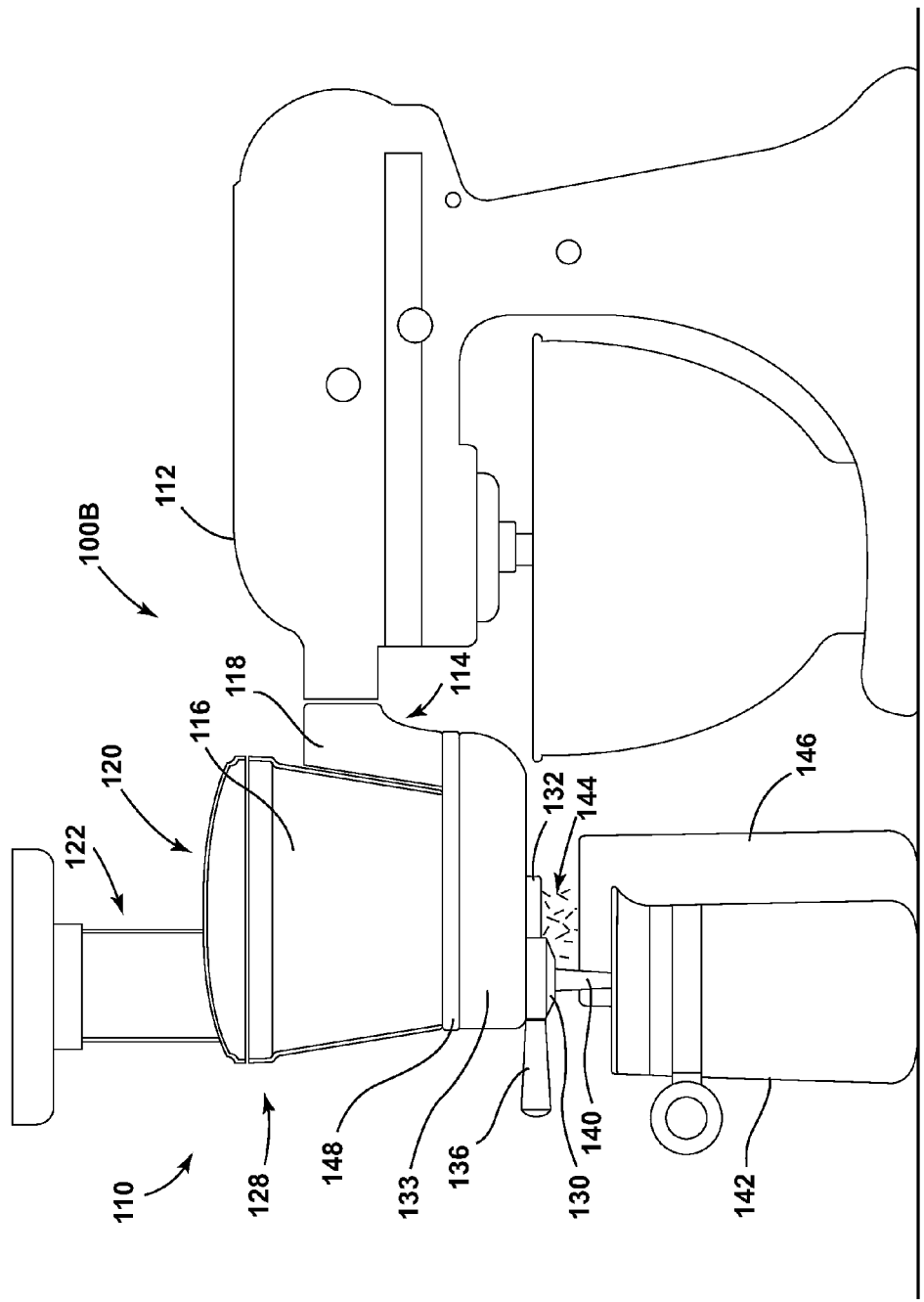
FIG. 4 is a simplified side elevation view of a juicing system according to the present disclosure.

In the embodiment of the juicing system 100B depicted in FIG. 4, the juice spout 130 and the pulp spout 132 each exit the main housing 116 through the bottom surface 117 of the housing 116, and extend through the lower housing 133. The juice spout 130 directs juice 140 into the juice container 142 and the pulp spout 132 directs pulp 144 into the pulp waste container 146.

Figure 5:
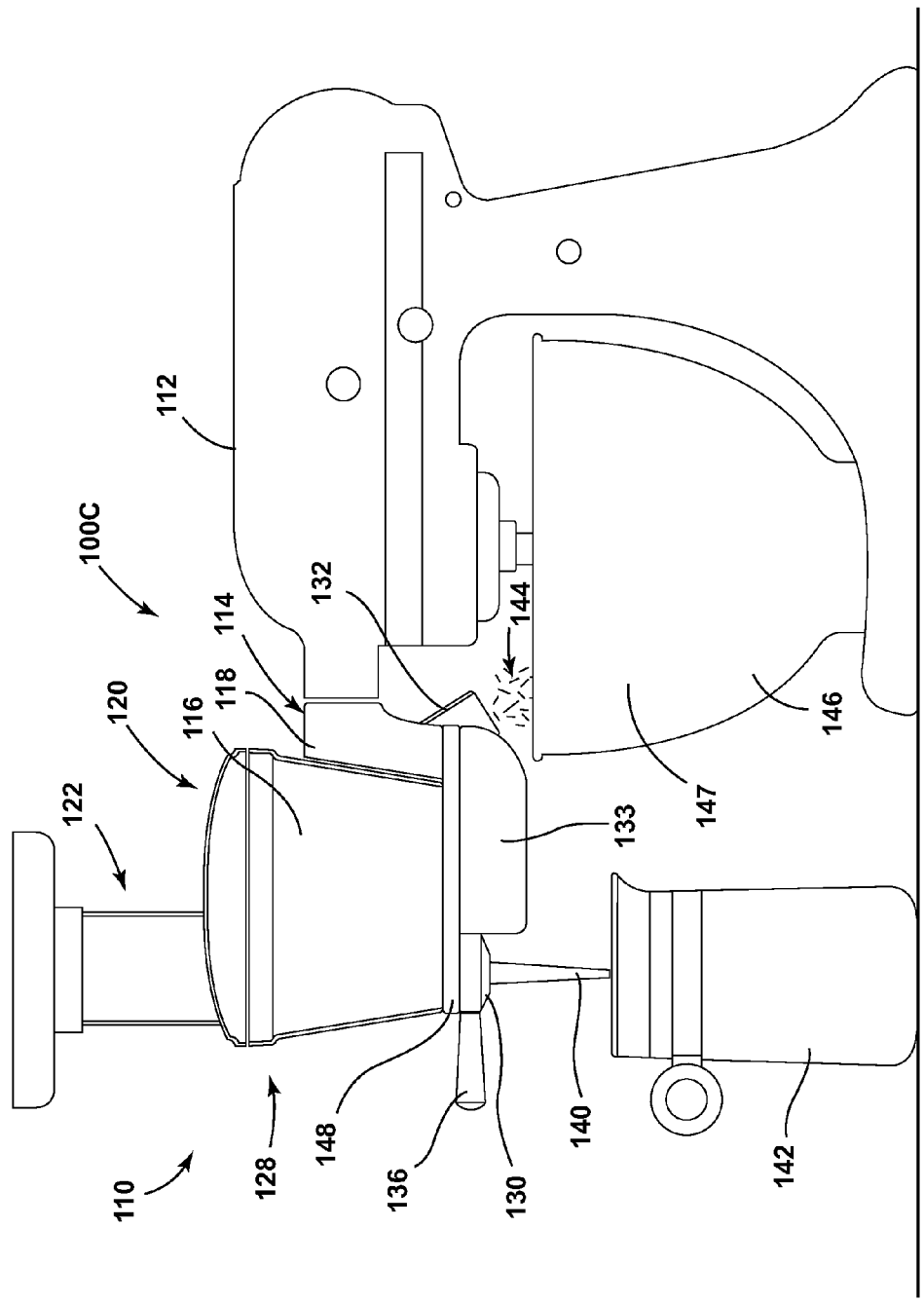
FIG. 5 is a simplified side elevation view of a juicing system according to the present disclosure.

In the embodiment of the juicing system 100C depicted in FIG. 5, the juice spout 130 exits the main housing 116 through the bottom surface 117 of the housing 116. The pulp spout 132 exits the main housing 116 through a peripheral wall 119 of the main housing 116. In this embodiment, the juice spout 130 is located distally from the pulp spout 132 (with respect to the drive mechanism 112), and the juice spout 130 does not extend through the lower housing 133. The juice spout 130 directs juice 140 into a juice container 144. Additionally, the pulp spout 132 passes outside of the lower housing 133, and directs pulp 144 into a mixing bowl 147, which functions as the pulp waste container 146.

Figure 6:
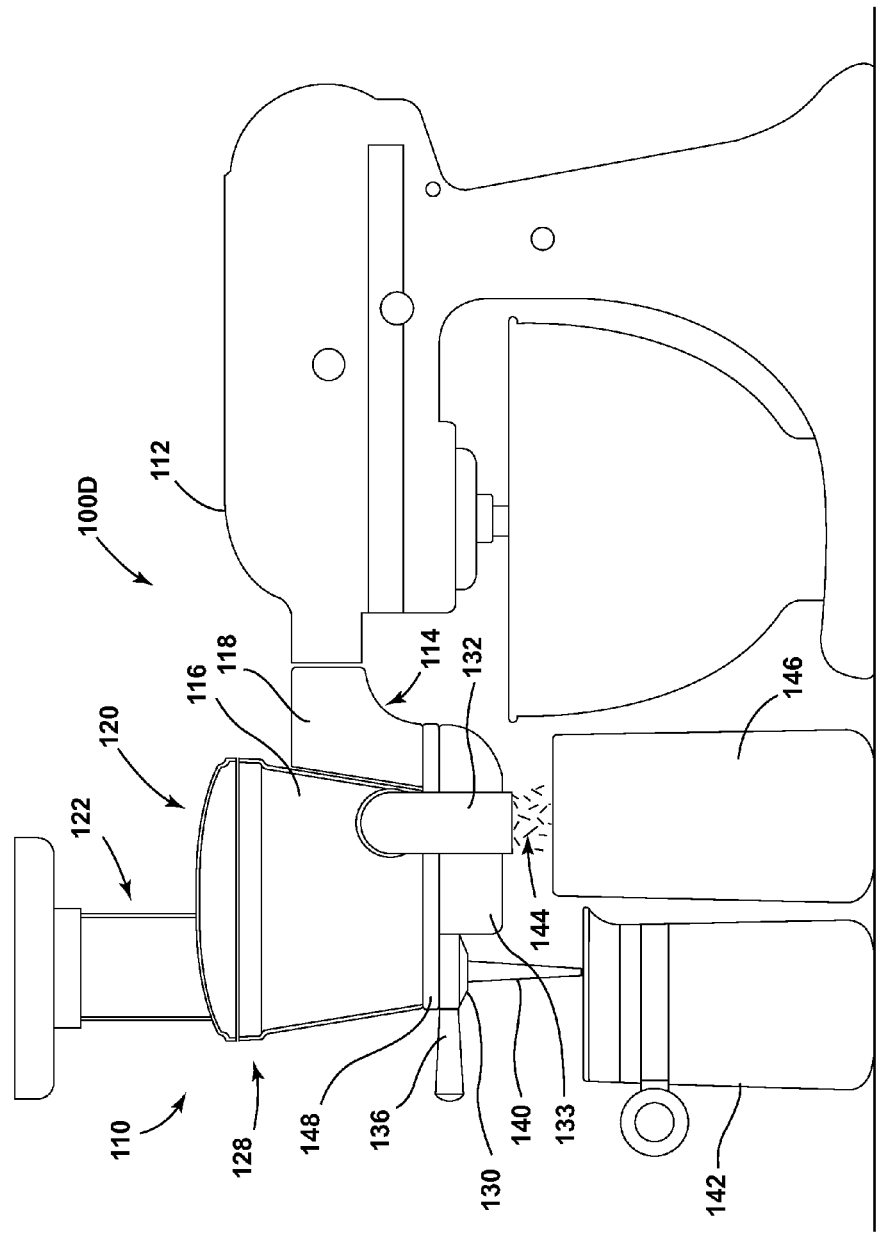
FIG. 6 is a simplified side elevation view of a juicing system according to the present disclosure.

In the embodiment of the juicing system 100D depicted in FIG. 6, the juice spout 130 exits the main housing 116 through the bottom surface 117 of the housing 116. The pulp spout 132 exits the housing 116 through a peripheral wall 119 of the main housing 116. In this embodiment, the juice spout 130 is located distally from the pulp spout 132 (with respect to the drive mechanism 112), and neither the juice spout 130 nor the pulp spout 132 extend through the lower housing 133. The juice spout 130 directs juice 140 into the juice container 142 and the pulp spout 132 directs pulp 144 into the pulp waste container 146.

Figure 7:
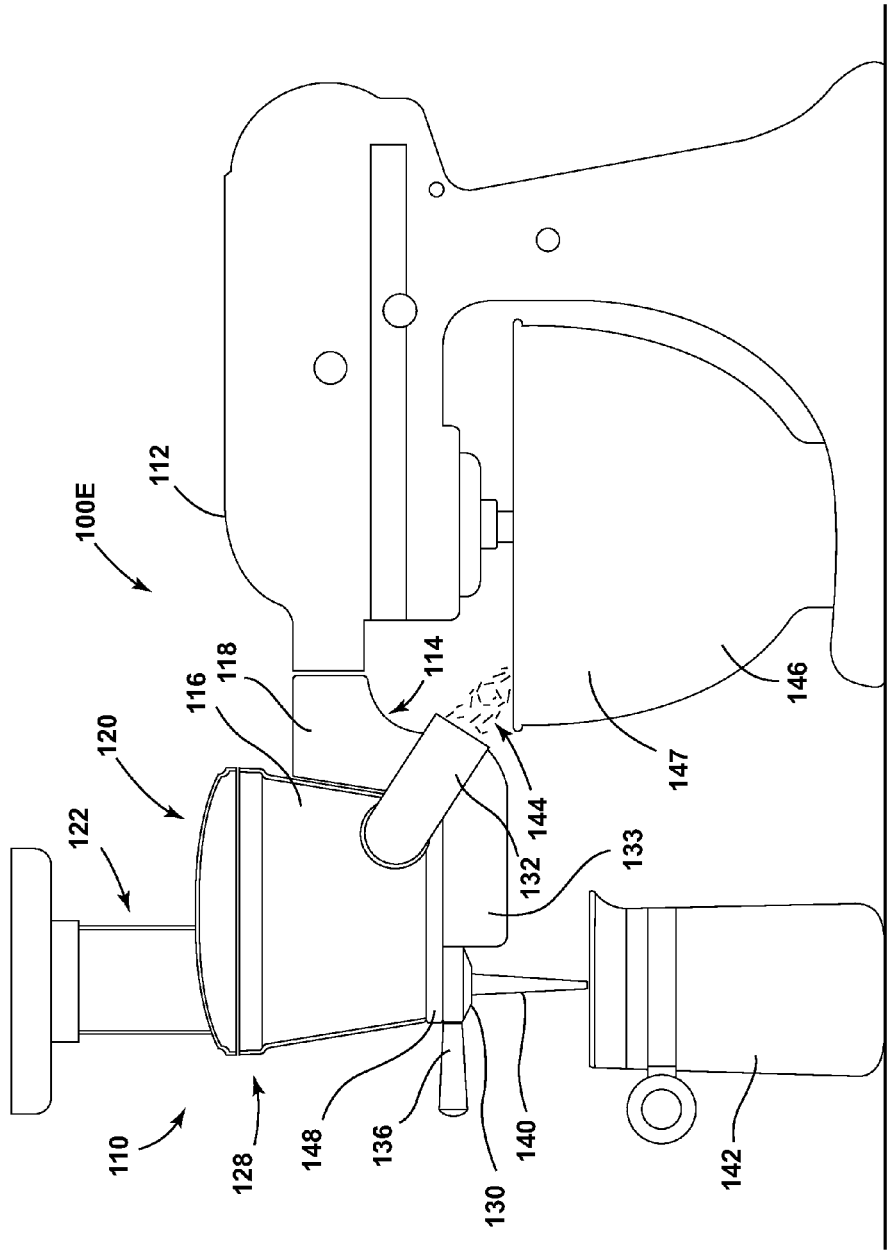
FIG. 7 is a simplified side elevation view of a juicing system according to the present disclosure.

In the embodiment of the juicing system 100E depicted in FIG. 7, the juice spout 130 exits the main housing 116 through the bottom surface 117 of the housing 116. The pulp spout 132 exits the housing 116 through a peripheral wall 119 of the main housing 116. In this embodiment, the juice spout 130 is located distally from the pulp spout (with respect to the drive mechanism 112), and neither the juice spout nor the pulp spout extend through the lower housing 133. The juice spout 130 directs juice 140 into the juice container 142 and the pulp spout 132 directs pulp 144 into the mixing bowl 147, which functions as the pulp waste container 146.

Figure 8:
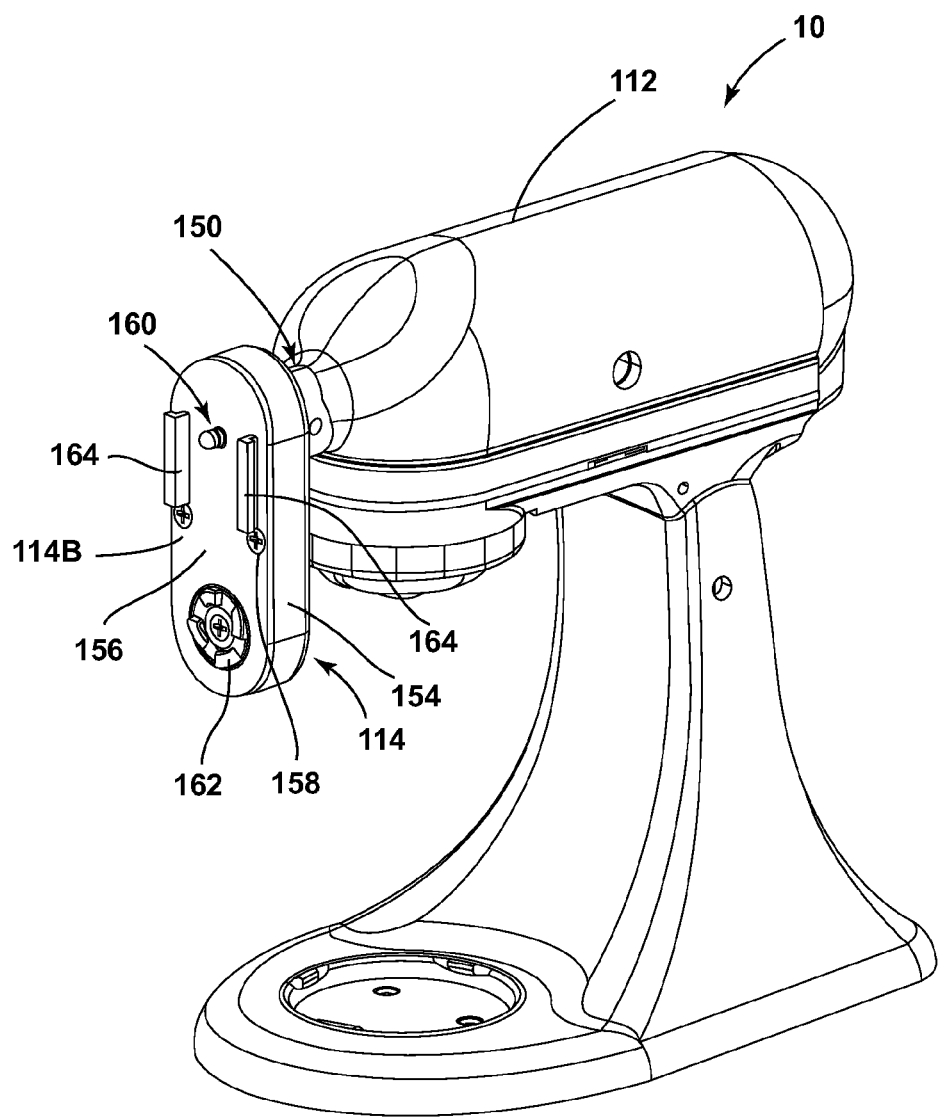
FIG. 8 is a perspective view of a stand mixer with a juicing assembly removed to reveal a power pod.
Figure 9:
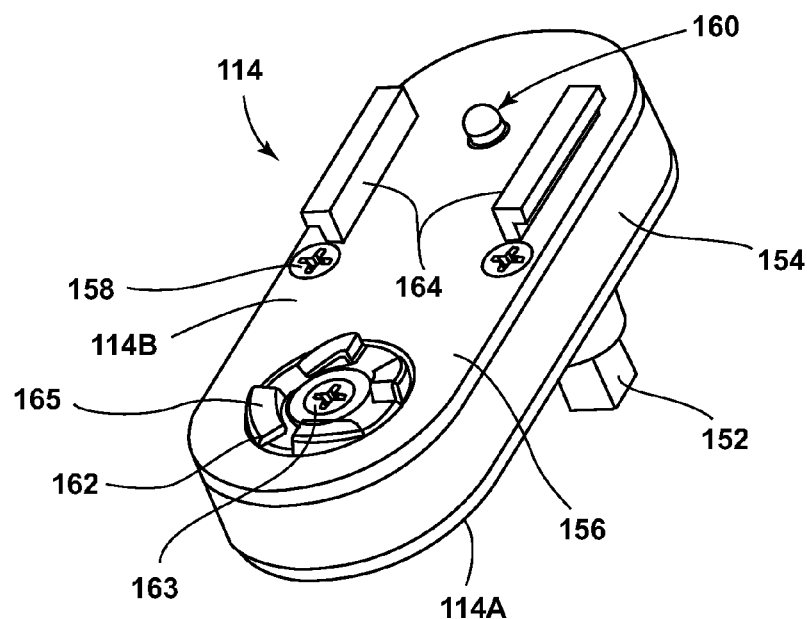
FIG. 9 is perspective view of an outer surface of the power pod.

Referring now to FIG. 8, an exemplary power pod 114 is configured in rotatable engagement with the drive mechanism 112. As illustrated, the drive mechanism 112 is configured as a stand mixer 10 having an auxiliary attachment point 150 on a front area of the mixer, which defines an attachment hub or port. The attachment point 150 may be configured to laterally receive a drive shaft 152 which, as shown in FIG. 9, extends outwardly from an inner surface 114A of the power pod 114. The shaft 152 may be configured to receive and transmit a torque from the drive mechanism 112 to an attachment or accessory, such as the juicer assembly 110 described above. In the embodiment of FIGS. 8 and 9, the power pod 114 is illustrated as a separate unit, but may be configured as an integral part of the drive mechanism 112 or the juicer assembly 110.

Figure 11:
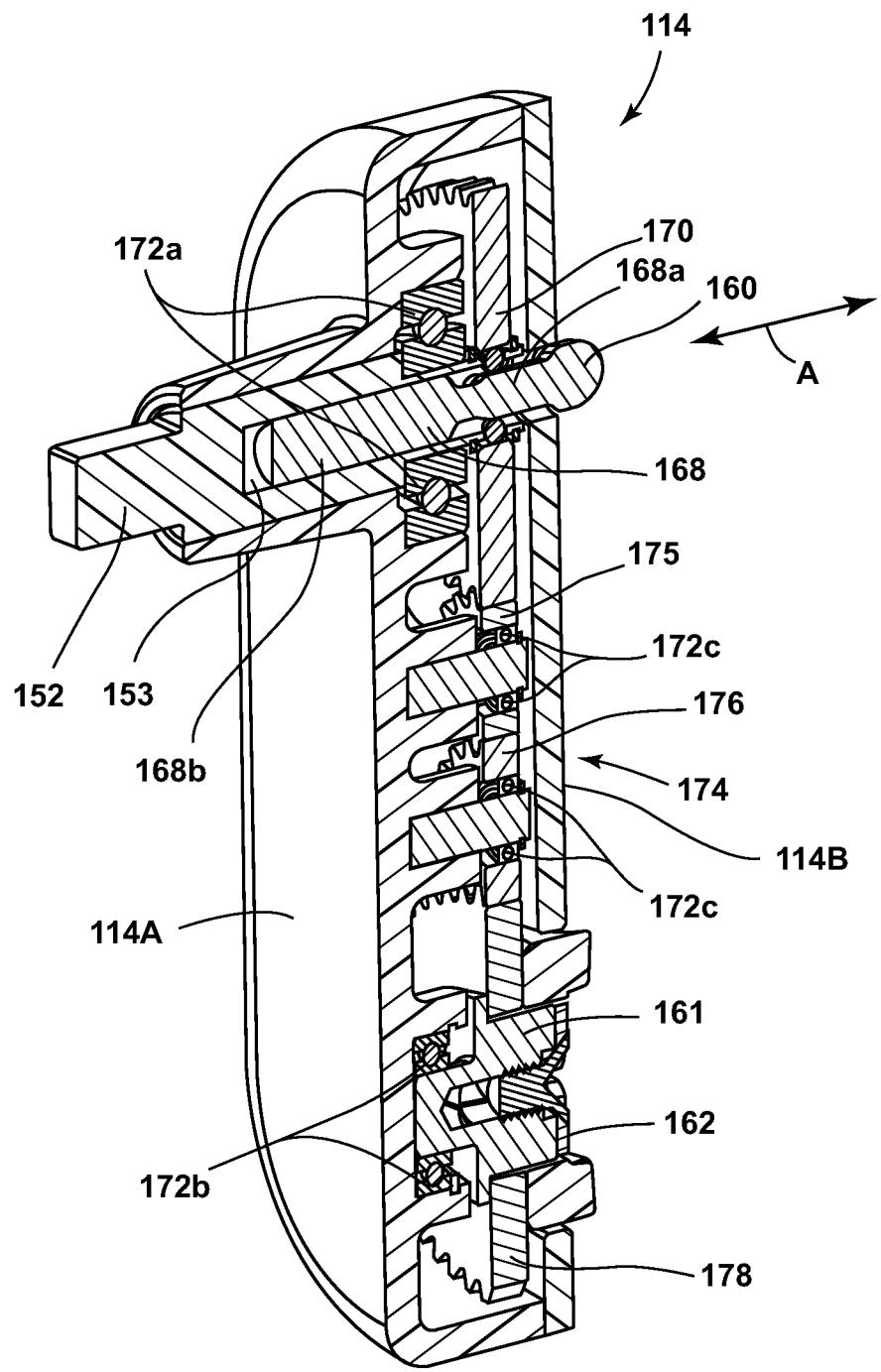
FIG. 11 is a cross-sectional view of the power pod of FIG. 10 taken at line XI.

The power pod 114 may include a housing 154 for enclosing a plurality of torque transmitting elements, such as, but not limited to drive gears and drive belts. The power pod housing 154 may include at least one removable wall 156 secured to the housing 154 with fasteners 158. When assembled, the housing 154 and wall 156 create a substantially sealed cavity for the torque transmitting elements, wherein the housing 154 defines an inner surface 114A of the power pod 114, and the removable wall 156 defines an outer surface 114B of the power pod 114. Additionally, a lower shaft 161, as shown in FIG. 11, is coupled to a power pod clutch plate 162 via fastener 163. The power pod clutch plate 162 includes a plurality of ramped splines 165 that are adapted to engage the splines of a reciprocal slip clutch plate as further described below. As further shown in FIG. 8, power pod clutch plate 162 is a fixed clutch plate that is accessible from the outer surface 114B at removable wall 156 as coupled to the stand mixer 10. The clutch plate 162 is configured to at least partially extend from the outer surface 114B, as shown in FIG. 8, but may also be partially recessed within the wall 156. As further shown in FIG. 8, an interlock element 160 extends outwardly from the outer surface 114B and is configured to engage at least the shaft 152 and at least one torque transmitting element to prevent activation or rotation of the shaft 152 when the power pod 114 is not properly connected to the juicing assembly 110 or any other adaptable mixer attachment. In assembly, the interlock element 160 will generally abut a surface of the juicer assembly 110 which depresses the interlock element 160 into an engaged position with shaft 152. When the interlock element 160 is in the engaged position, shaft 152 can be driven through the power pod 114 as powered by the drive mechanism 112. The interlock element 160 is shown disposed between mounting elements 164 which also extend outwardly from the outer surface 114B of power pod 114, and are configured to releasably couple the juicing assembly 110, or any other suitable mixer attachment, to the power pod 114 for driving engagement with the drive mechanism 112.

Figure 10:
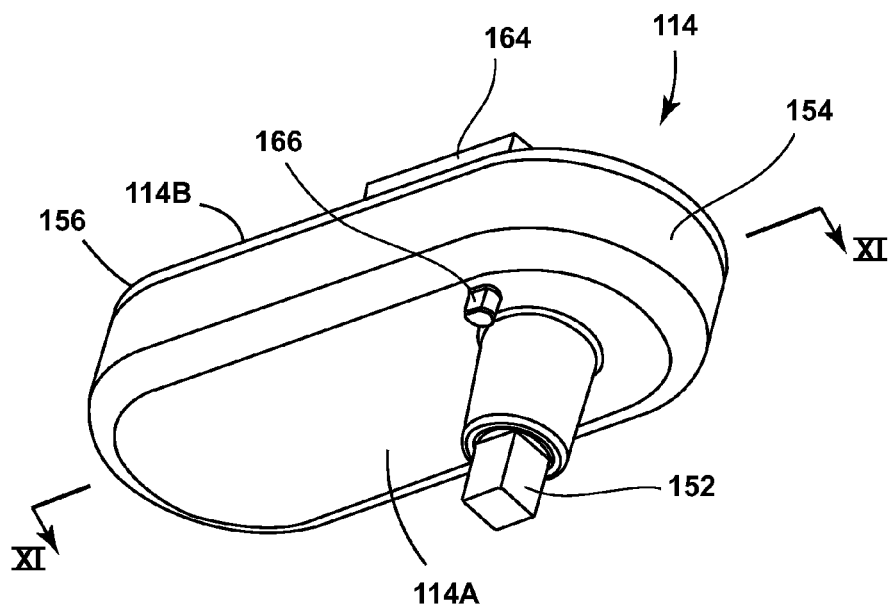
FIG. 10 is perspective view of an inner surface of the power pod of FIG. 9.

Referring now to FIGS. 9 and 10, the mounting elements 164 are configured as outwardly opening L-shaped brackets which are adapted to slidingly engage a corresponding element disposed on the juicer assembly 110 to mechanically couple the juicer assembly 110 thereto. It is contemplated that a variety of mounting elements 164 may be employed, such as, but not limited to, a threaded connection a pin and socket connection or other known releasable attaching elements. With specific reference to FIG. 10, an anti-rotation element 166 extends outwardly from the inner surface 114A of the power pod 114 to be received in a reciprocally shaped slot disposed on the attachment point 150. As received therein in an abutting relationship, the anti-rotation element 166 prevents the power pod 114 from rotating under certain torque conditions as driven by the drive mechanism 112.

Referring now to FIG. 11, a cross-sectional view of the power pod 114 along a vertical centerline XI of FIG. 10 is shown. As illustrated in FIG. 11, the interlocking element 160 includes a pin 168 for sliding engagement within a channel 153 of the shaft 152 along a path as indicated by arrow A. In this way, the interlock element 160 is moveable between engaged and unengaged positions with the shaft 152, and is shown in FIG. 11 in the unengaged position. When in the engaged position, the interlock element 160 is gearingly coupled with a first torque transmitting element 170 at a first coupling portion 168a of pin 168, an is further coupled, on an opposite end, to shaft 152 at a second coupling portion 168b of pin 168. The first torque transmitting element 170 is supported in the cavity defined by the housing 154 on an upper bearing element 172a. As illustrated in FIG. 11, the first torque element 170 is configured to gearingly engage a lower torque transmitting element 178 through at least one additional drive element, such as, but not limited to, drive system 174, which includes gears 175 and 176. The drive system 174 may also comprise a drive belt or magnetic drive element for powering lower torque transmitting element 178. As illustrated in FIG. 11, the lower torque transmitting element 178 is supported on a lower bearing element 172b, while gears 175 and 176 are supported on bearing elements 172c. Thus, the power pod 114 is adapted to couple to the attachment point 150 of the mixer 10 at shaft 152. As coupled thereto, the shaft 152 is driven by the drive mechanism 112 to rotate within the power pod 114. When the interlocking element 160 is in the engaged position, shaft 152 drives first torque transmitting element 170 which is gearingly engaged with coupling portion 168a of the pin 168 of the interlocking element 160. As coupled thereto, the first torque transmitting element 170 drives gear 175 which further drives gear 176 as these components are gearingly engaged or in a driven engagement with one another. Finally, gear 176 is gearingly engaged with lower torque transmitting element 178 which is coupled to shaft 161. In this way, the driven engagement of shaft 152 powers the rotation of shaft 161 through the drive system 174 of the power pod 114. It is contemplated that the drive system 174 of the power pod 114 may include any number of gears or other torque transmitting elements as necessary to translate torque along the length of the drive system 174. As noted above, the shaft 161 is coupled to clutch plate 162 which, in assembly, is adapted to couple to an attachment for providing an overload clutch engagement of a mixer attachment as further described below. Thus, the power pod includes a first shaft 152 rotating about a first axis and a second shaft 161 rotating about a second axis. The first and second axes are parallel axes that are spaced apart along a length of the power pod 114 between upper and lower portions thereof.

Figure 12:
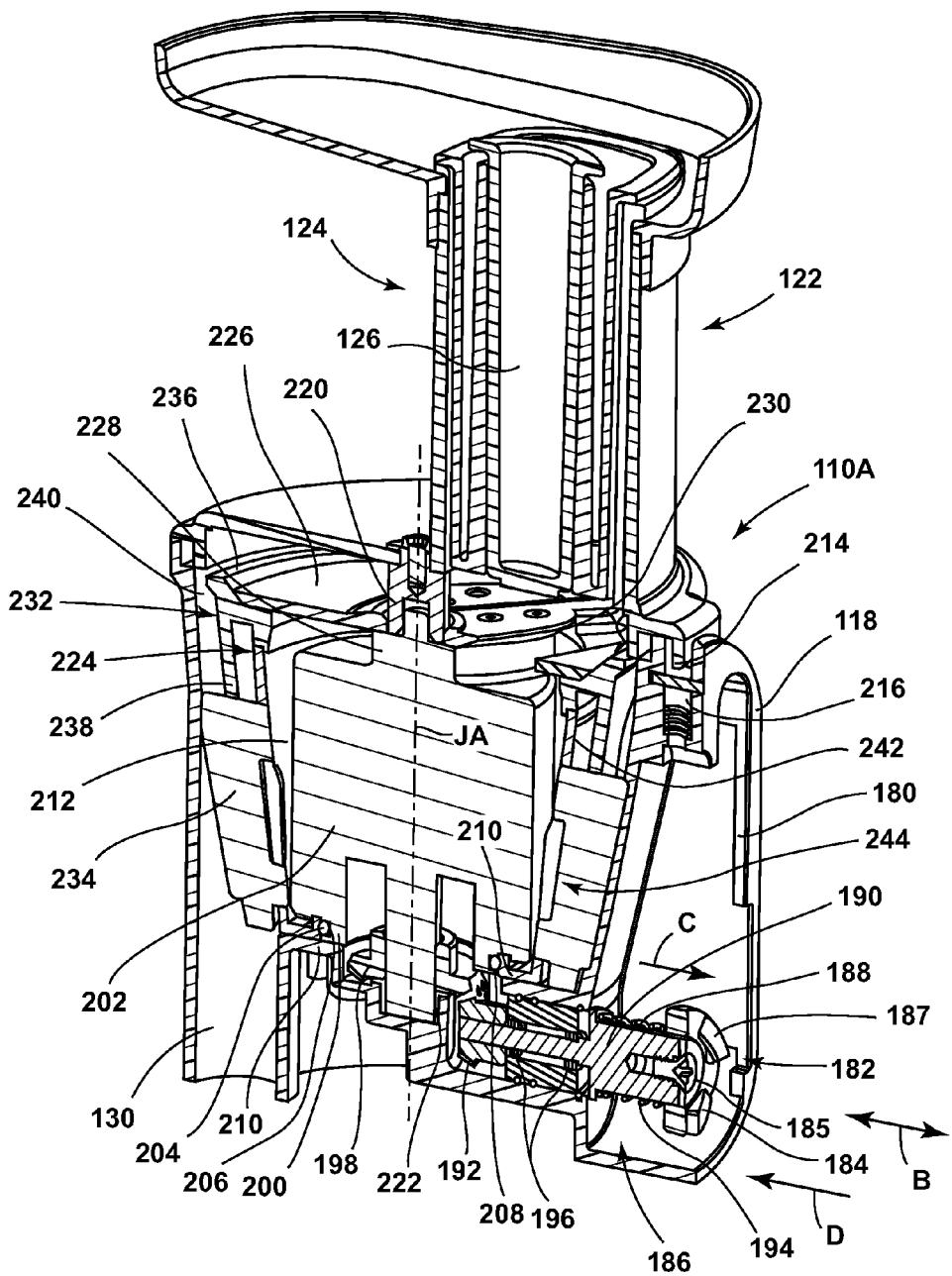
FIG. 12 is a cross-sectional view of the juicing system of FIG. 1 coupled to the power pod of FIG. 9.

Referring now to FIG. 12, a cross-sectional view of a juicing assembly 110A is shown, according to another embodiment. Specifically, in this embodiment, the mounting flange 118 is extends integrally from the main housing 116. The mounting flange 118 includes corresponding mounting members 180 configured to slidingly engage the power pod mounting elements 164 through an aperture 182 to releasably couple the juicing assembly 110A to the power pod 114. A slip clutch plate 184 and clutch mechanism 186 having a spring 188 are supported on a generally horizontally extending attachment shaft 190 for transmitting torque to a first bevel gear 192 from the drive mechanism 112. The clutch plate 184 is coupled to shaft 190 at an innermost side via a fastener 185. The clutch plate 184 and spring 188 are configured to slide laterally along an outer surface 194 of the length of the shaft 190 between engaged and disengaged positions in a direction indicated by arrow B. In this way, the clutch plate 184 can be depressed to the disengaged position along the path indicated by arrow B to allow for disengagement of the shaft 190 from the clutch plate 162 (FIG. 11) of the power pod 114 to prevent an overload condition. The spring 188, shown here in the form of a coil spring, defines a biasing mechanism which biases the clutch plate 184 outwardly towards the engaged position in as direction as indicated by arrow C. The clutch plate 184 includes a plurality of ramped splines 187 which are configured to engage the complementary ramped splines 165 of clutch plate 162 of the power pod 114 in assembly. The shaft 190 is supported by at least one bearing 196 and is sealed in assembly from fluids, such as the juice 140. The first bevel gear 192 is disposed in a generally vertical position and is configured to engage a horizontal bevel gear 198 disposed on a bottom surface 200 of a juicing auger 202. It is contemplated that the horizontal bevel gear 198 is a gear that can be molded into the body of the auger 202 or pressed into engagement with the auger 202 at the bottom surface 200 of the auger 202. Further, horizontal bevel gear 198 can be disposed on any drive member of an attachment accessory, such as auger 202 in the juicing attachment 110A, thereby driving the drive member on an attachment axis that is substantially perpendicular to the axes of the first and second shafts 152, 161.

As noted above, clutch plate 184 is disposed on and is accessible from an innermost surface of juicer assembly 110A. In assembly, clutch plate 184 is adapted to align with clutch plate 162 of the power pod 114 which is disposed at an outermost surface 114B of the power pod 114. The clutch plate 162, 184 are adapted to translate torque from the power pod 114 to the juicer assembly 110A in a splined slip clutch arrangement. Specifically, the ramped splines 165, 187 of the clutch plates 162, 184, respectively, engage one another, such that clutch plate 162 can drive clutch plate 184. As noted above, spring 188 serves as a biasing mechanism to clutch plate 184 to bias the clutch plate 184 towards engagement with clutch plate 162. When the contents of the juicer assembly 110A cause the auger 202 to seize or otherwise jam, an overload torque condition is realized on the bevel gears 198, 192. When this overload torque condition occurs, clutch plate 184 can move laterally outward towards the disengaged position along a path as indicated by arrow B, thereby allowing the ramp splines 187 to slip from engagement from the ramped splines 165 of clutch plate 162. In this way, the clutch mechanism 186 provides a slip configuration to avoid excessive torque situations which could damage the components of the juicer assembly 110A. Thus, the clutch mechanism 186, having spring 188, defines a constant force clutch mechanism 186 which is configured to slip relative to a specific predetermined torque condition. The spring 188 can be tuned to a specific predetermined torque condition, wherein a lower compression force spring would reduce the predetermined torque condition, and a higher spring force would increase the predetermined torque condition. As such, when a predetermined torque condition is realized on the clutch mechanism 186, the biasing force of the spring 188 in the direction as indicated by arrow C will be overcome, such that the clutch plate 184 will move towards the disengaged position, as indicated by arrow D to disengage the clutch plate 184 from clutch plate 162. With reference to FIGS. 11 and 12, the clutch plate 184 is considered the slip clutch plate as clutch plate 184 is laterally moveable along the path as indicated by arrow B between engaged and disengaged positions. Clutch plate 162 of the power pod 114 is considered a fixed clutch plate. It is contemplated that either clutch plate 162, 184 may include a spring and slip configuration as found on clutch plate 184 of FIG. 12 in clutch mechanism 186.

As further shown in FIG. 12, a seal 204 is configured in a channel 206 that is cut or molded into a lower edge 208 of the auger 202. The seal 204 may create a fluid tight connection between the auger 202 and a bottom internal surface 210 of the main housing 116. Alternatively, a seal may be positioned at a plurality of other locations provided the seal prevents fluid transfer between juicing cavity 212 and the bevel gears 198, 192 or clutch assembly 186.

As further shown in FIG. 12, an interlock engagement tab 214 is illustrated in a locked position, such that the tab 214 pushes downwardly on a pin 216 which then engages the interlocking element 160 of the power pod 114 to activate the power pod 114 as described above. A spring 218 is used to bias the pin 216 upwardly, thereby disengaging the power pod 114 when the tab 214 is in the unlocked position. The locked position of the tab 214 allows a user to engage the drive mechanism 112 to operate the juicing system 100.

With continued reference to FIG. 12, the auger 202 is disposed between an upper bushing 220 and a lower bushing 222, thereby preventing displacement of the auger 202 during a juicing process. In one preferred embodiment, the auger 202 is rotated at a speed of about 60 to about 100 rotations per minute during the juicing process. Additionally, an auger accessory 224 is illustrated as including a cutter disk 226 attached to an upper surface 228 of the auger 202 and a cutter blade 230 is attached directly to the cutter disk 226. An integrated wiper arm assembly 232 is also attached to the upper surface 228 and includes at least one pliable or flexibly resilient wiper element 234 configured on at least one wiper arm 238. A wide rim 236 is configured on the top of the wiper arm assembly 232 and extends about an outer circumference of an internal main housing cavity 240. As further shown in FIG. 12, a juicing basket 242 having at least one screening element 244 is configured between the auger 202 and the main cavity wall 240.

Figure 13:
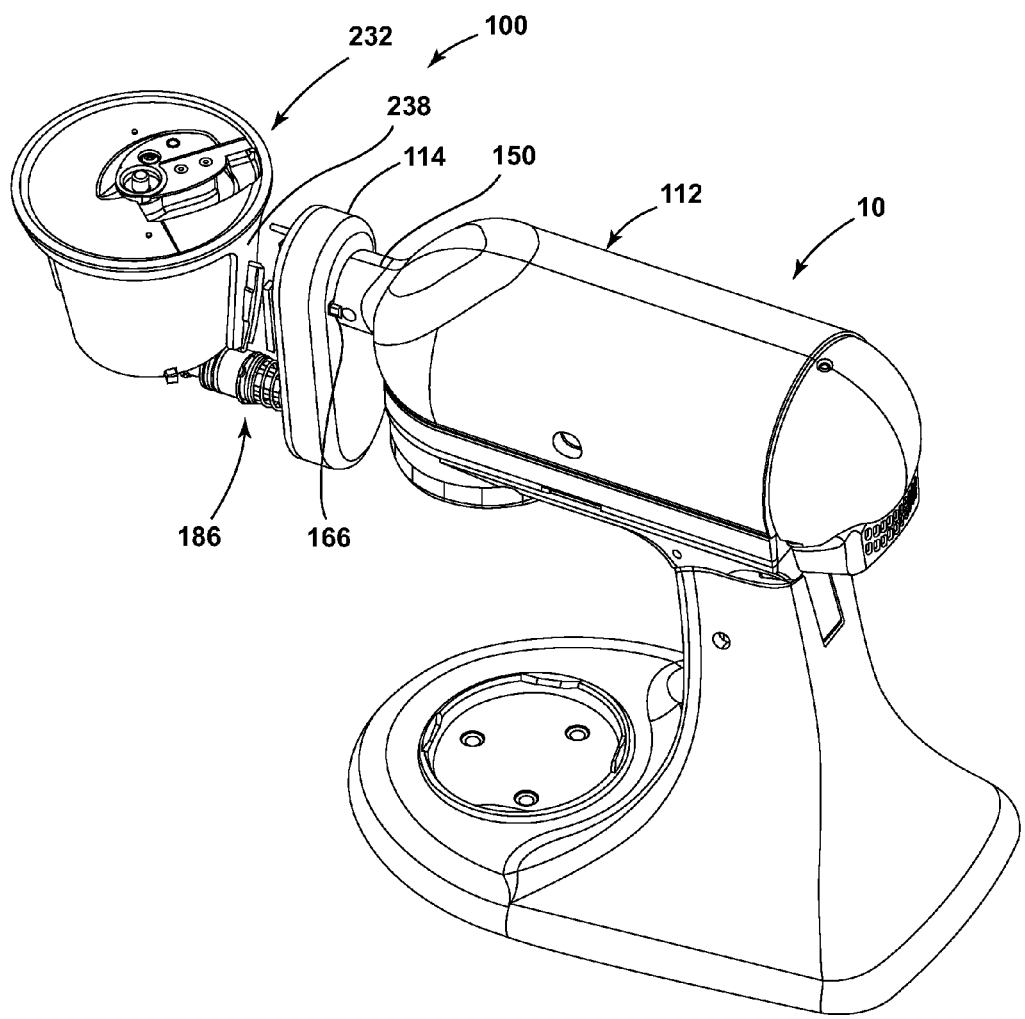
FIG. 13 is a rear perspective view of the mixer, power pod and juicing system of FIG. 1 with the main housing components removed from the juicer attachment.
Figure 14:
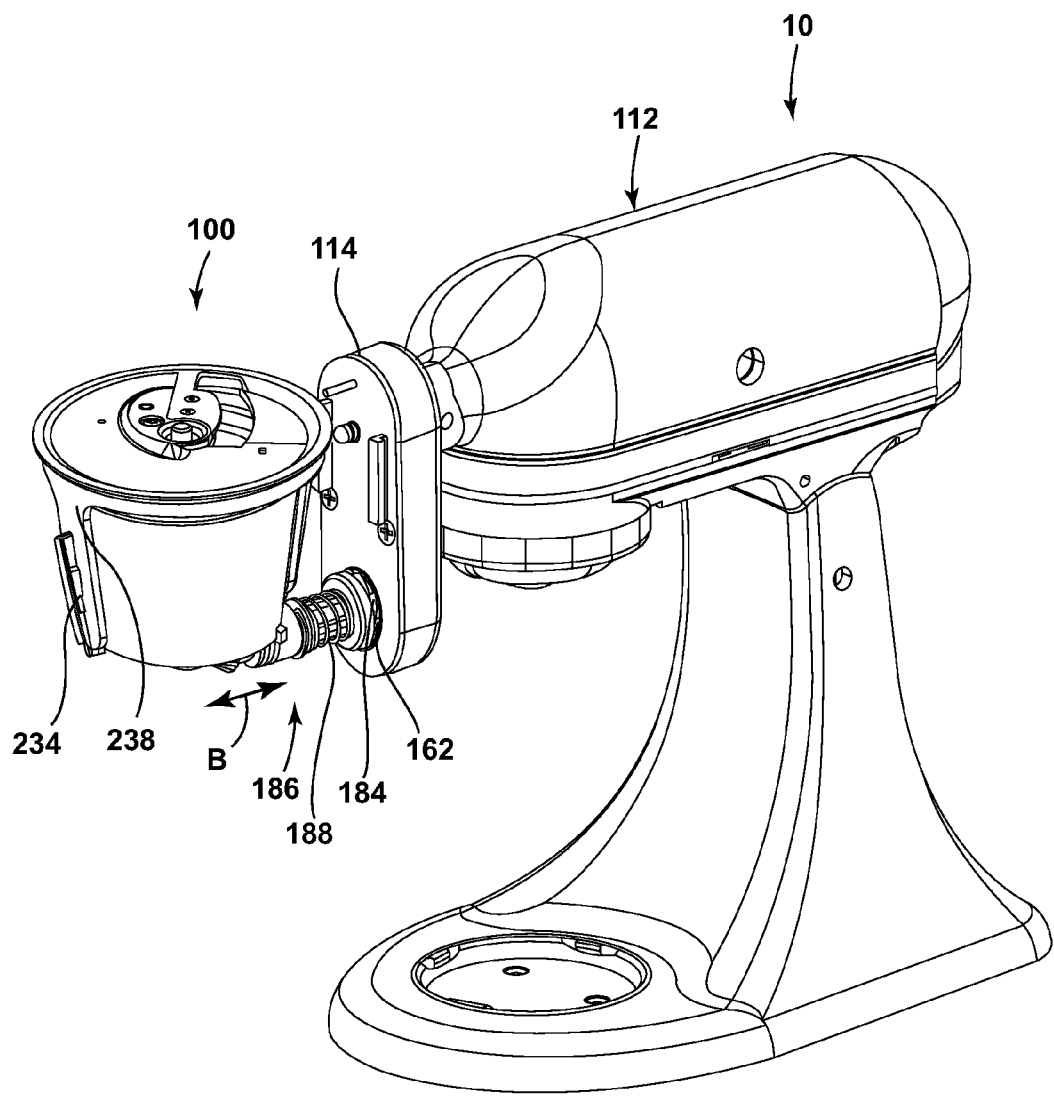
FIG. 14 is a front perspective view of the mixer, power pod and juicing system of FIG. 13.
Figure 15:
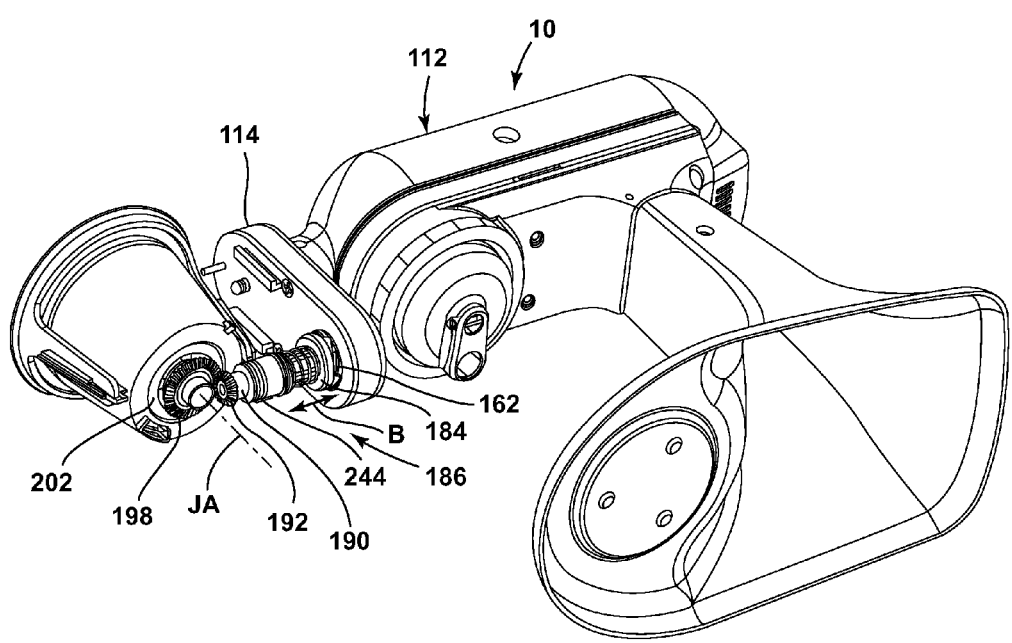
FIG. 15 is a bottom perspective view of the mixer, power pod and juicing system of FIG. 13.

Referring now to FIGS. 13, 14 and 15, an exemplary arrangement of the juicing system 100 is shown, wherein the main housing 116 and lid assembly 120 are removed to illustrate the engagement of the clutch plates 162, 184 and clutch assembly 186, the wiper arms 238 and wiper arm assembly 232 and engagement of the pliable wiper element 234 and the juicing basket 242. With specific reference to FIG. 15, the engagement of the bevel gears 192 and 198 demonstrates the transfer of a horizontal drive torque from shaft 190, into a vertical juicing torque along a juicing axis JA of the auger 202. Additional seals 244 may be utilized on the shaft 190 as an added protection for preventing fluids from entering the clutch assembly 186.

Figure 16:
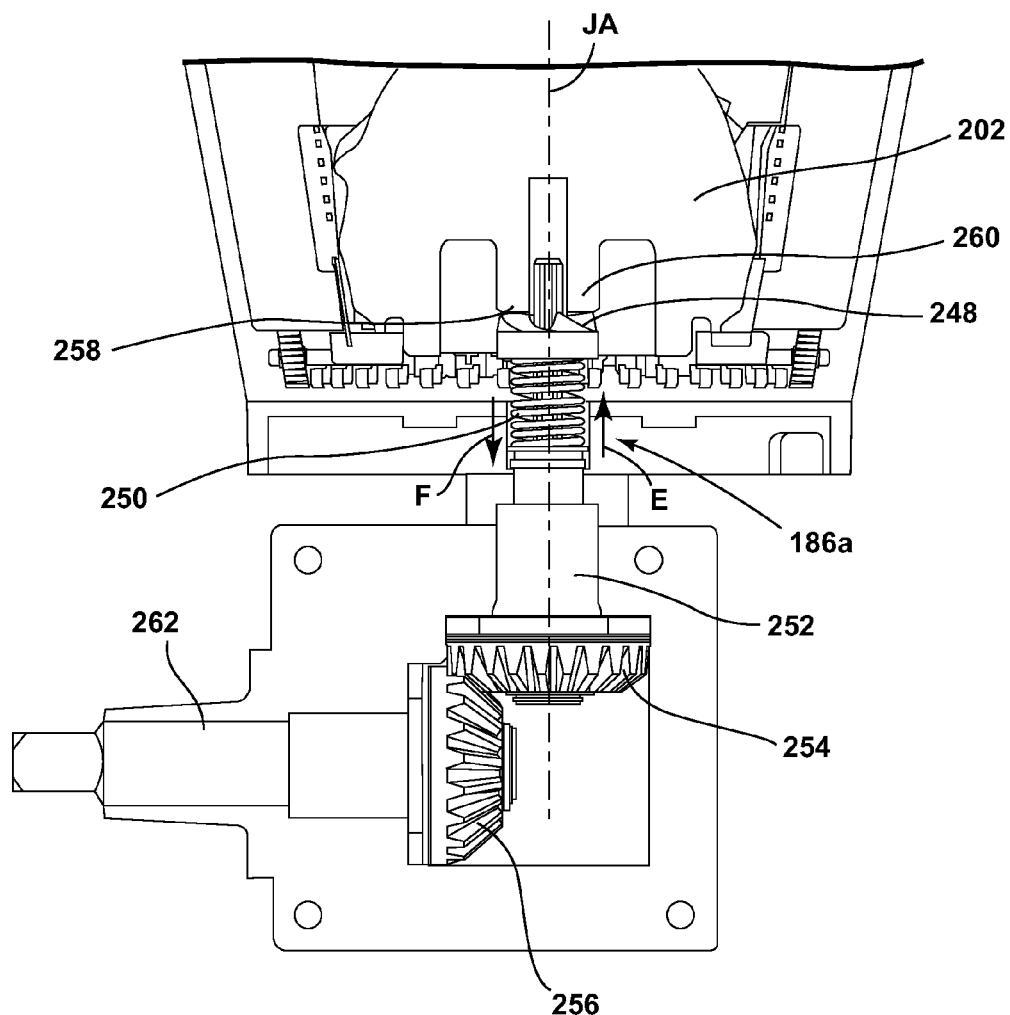
FIG. 16 is a partial cut away side view of another embodiment of a drive system having drive gears and an associated clutch assembly.
Figure 17:
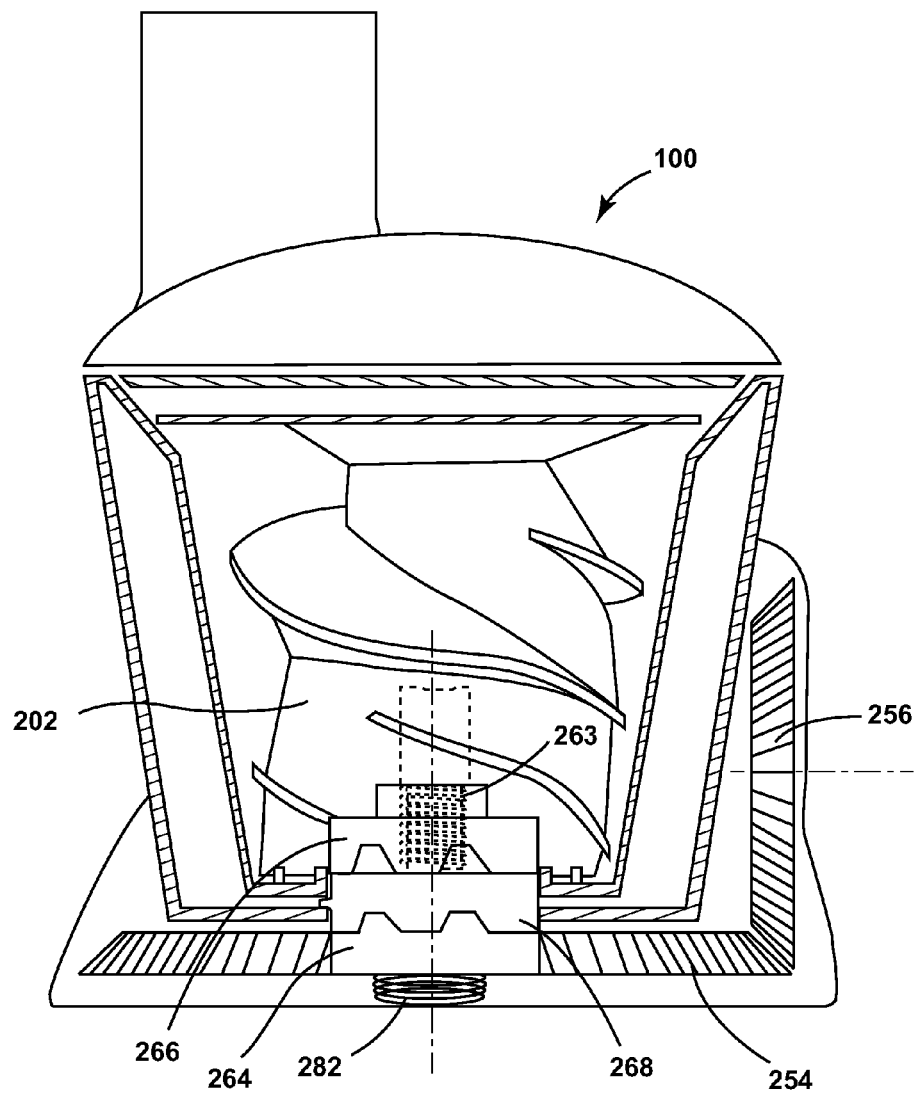
FIG. 17 is a partial cut away side view of another embodiment of a drive system having a drive gear and an associated clutch assembly.

Referring now to FIGS. 16-19, alternative arrangements for drive gears and clutch assemblies are shown. Specifically, FIG. 16 illustrates the clutch assembly 186a configured with a clutch plate 248 engaging a corresponding clutch surface 258 configured on a bottom surface 260 of the auger 202. A spring element 250 is used to vertically bias the clutch plate 248 to an engaged position with the auger 202 during normal use. In similar manner as described above with reference to spring 188, spring element 250 defines a biasing mechanism which has an upward biasing force indicated by arrow E that can be overcome at a predetermined torque level when auger 202 becomes seized or overloaded during a juicing process. Similar to spring 188, but in a vertical disposition, spring element 250 will be depressed in direction as indicated by arrow F to allow clutch plate 248 to vertically slip in engagement with clutch surface 258 along juicing axis JA, thereby protecting the mechanism from an overload condition. Additionally the spring 250 and clutch plate 248 are configured on a drive shaft 252 having an attached bevel gear 254 at an opposite end of the shaft 252 relative to the clutch plate 248. The bevel gear 254 is configured to transmit a torque from the drive mechanism 112 through a horizontal shaft 262 and a drive bevel gear 256. Conversely, FIG. 17 illustrates an exemplary arrangement wherein a spring element 282 may be mounted above the bevel gear 254 or below the bevel gear 254 on a vertical shaft 263, as shown in FIG. 17. The bevel gear 254 includes an integral clutch plate 264 that engages a second clutch plate 266 configured in the base of the auger 202. At least one of the clutch plates may be configured to define a slip clutch plate that is adapted to slide vertically in a splinded connection 268 between clutch plates 264, 266, thereby allowing the clutch plates 264, 266 to slip from engagement with one another as a predetermined torque level is realized on the system.

Figure 18:
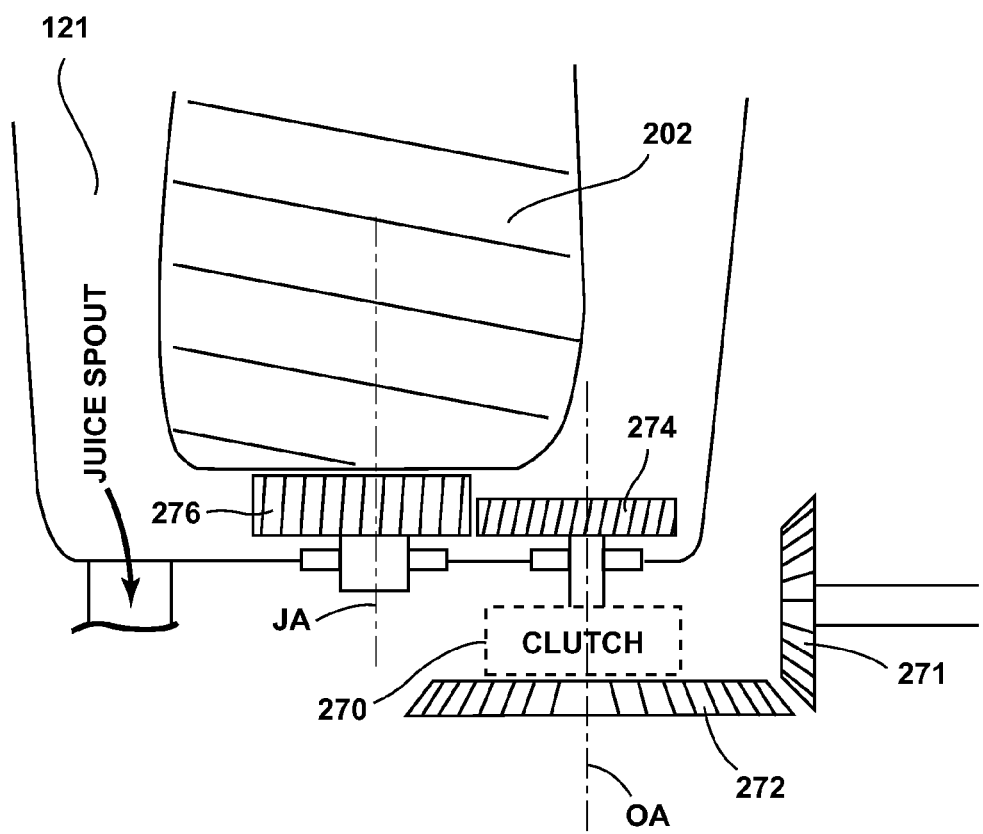
FIG. 18 is a partial cut away side view of another embodiment of a drive system having drive gears and an associated clutch assembly.

Referring now to FIG. 18, a clutch assembly 270 is configured in an offset axis "OA" relative to juicing axis "JA". The clutch assembly 270 is driven by a set of bevel gears 271, 272 to transmit torque through the clutch assembly 270 to an additional gear 274 which engages an auger drive gear 276. This exemplary arrangement may be used to create additional gear ratios that are tunable for juicing particularly fibrous or large food items.

Figure 19B:
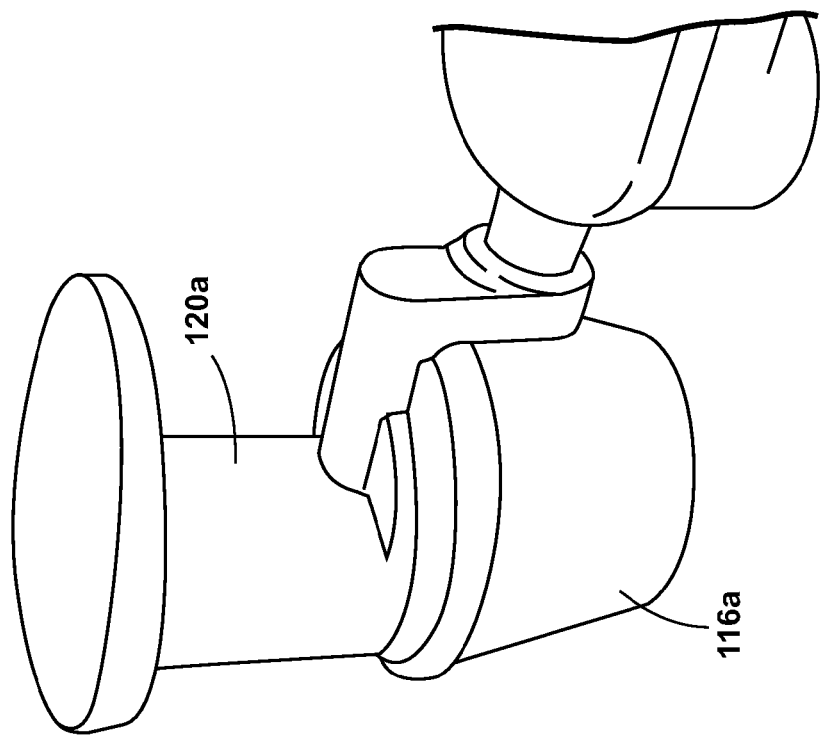
FIG. 19B is a perspective view of drive system of FIG. 19A.
Figure 19A:
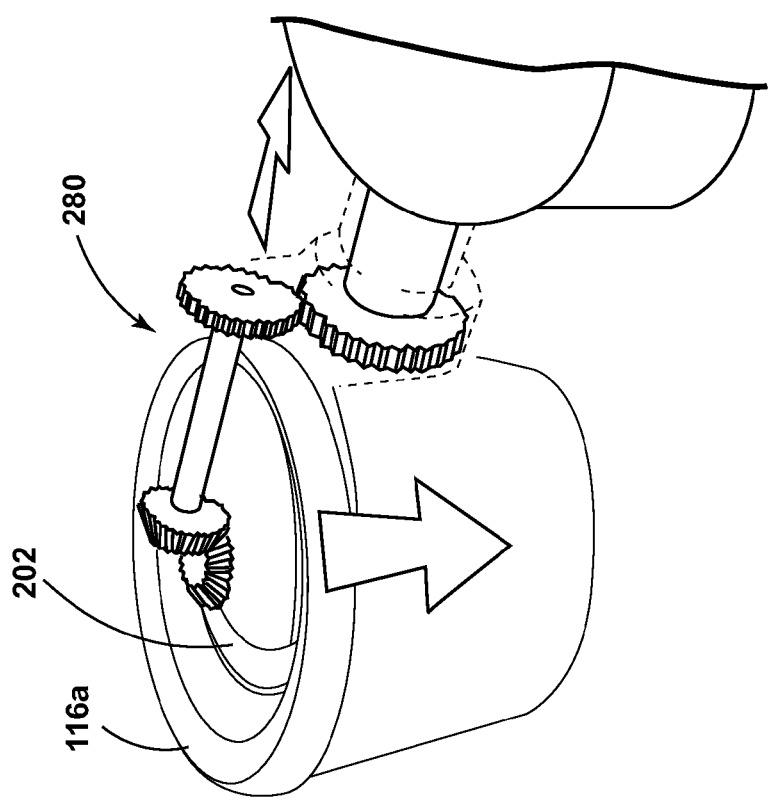
FIG. 19A is a partial cut away side perspective view of another embodiment of a drive system having an upper mounted drive gear.

Referring now to FIGS. 19A and 19B, an alternative arrangement is illustrated wherein the auger 202 is driven from the top of a main housing 116a through a series of gears 280 disposed below and adjacent to a lid assembly 120a. The top drive arrangement illustrated in FIGS. 19A and 19B may be beneficial to further avoid undesirable fluid contact with drive components during the juicing process.

Figure 20:
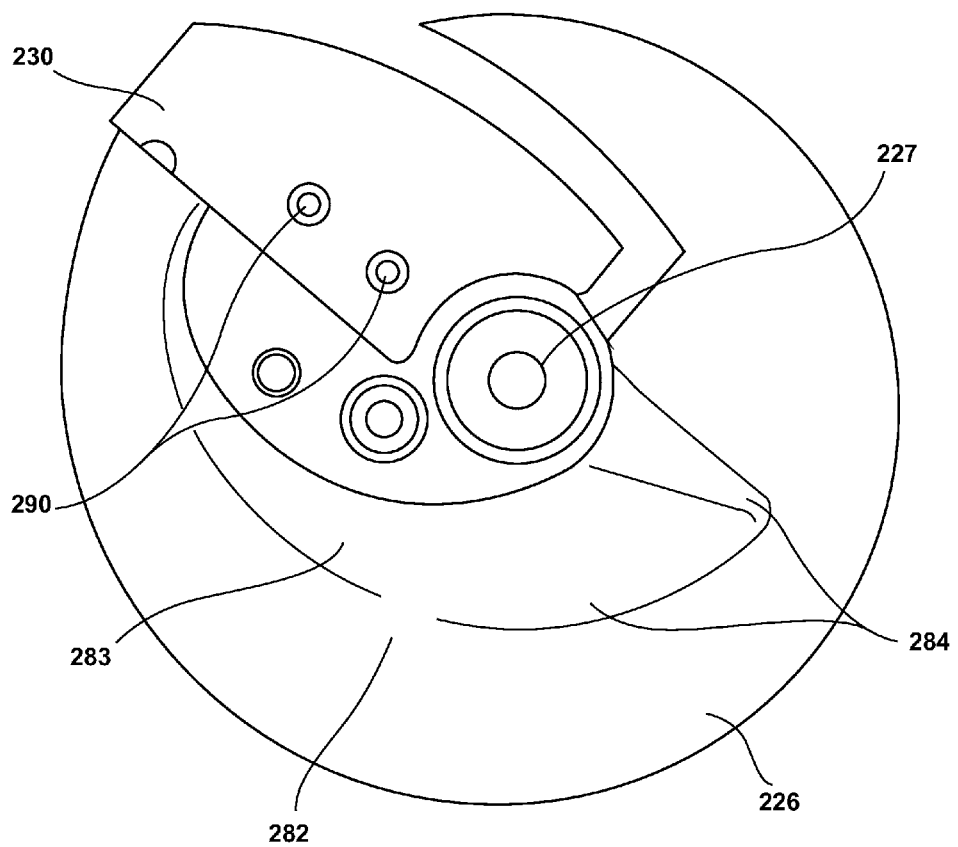
FIG. 20 is a top plan view of a cutter disk with a removable cutting blade for use in a juicer assembly according to the present disclosure.
Figure 21:
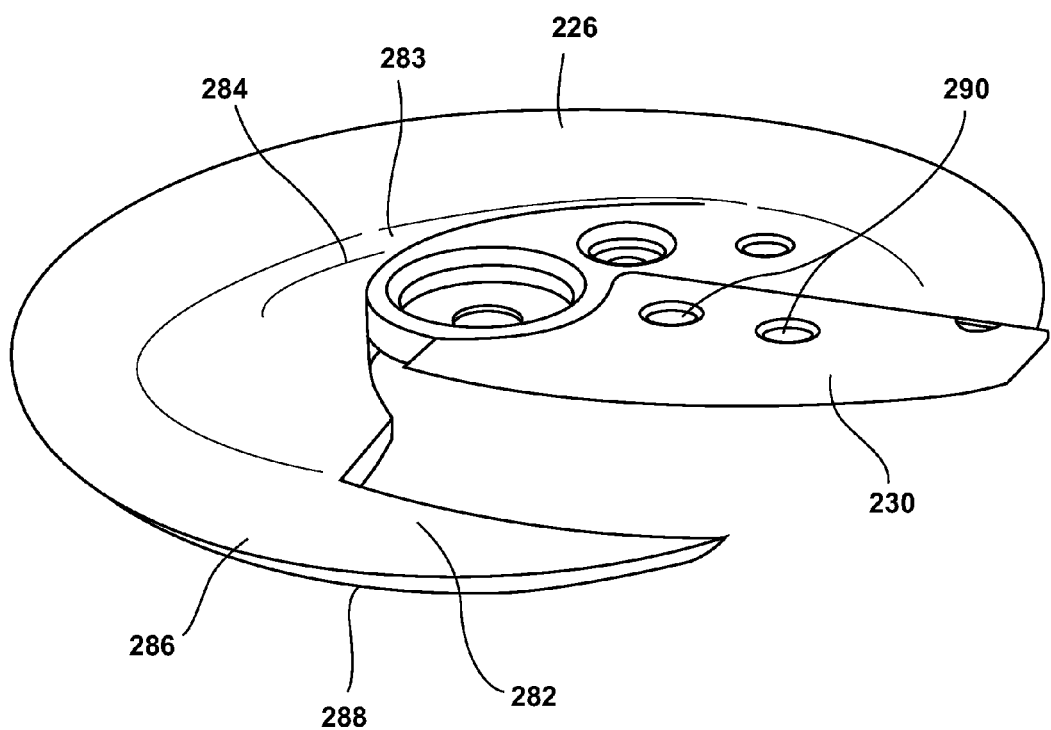
FIG. 21 is a top perspective view of the cutter disk shown in FIG. 20.
Figure 22:
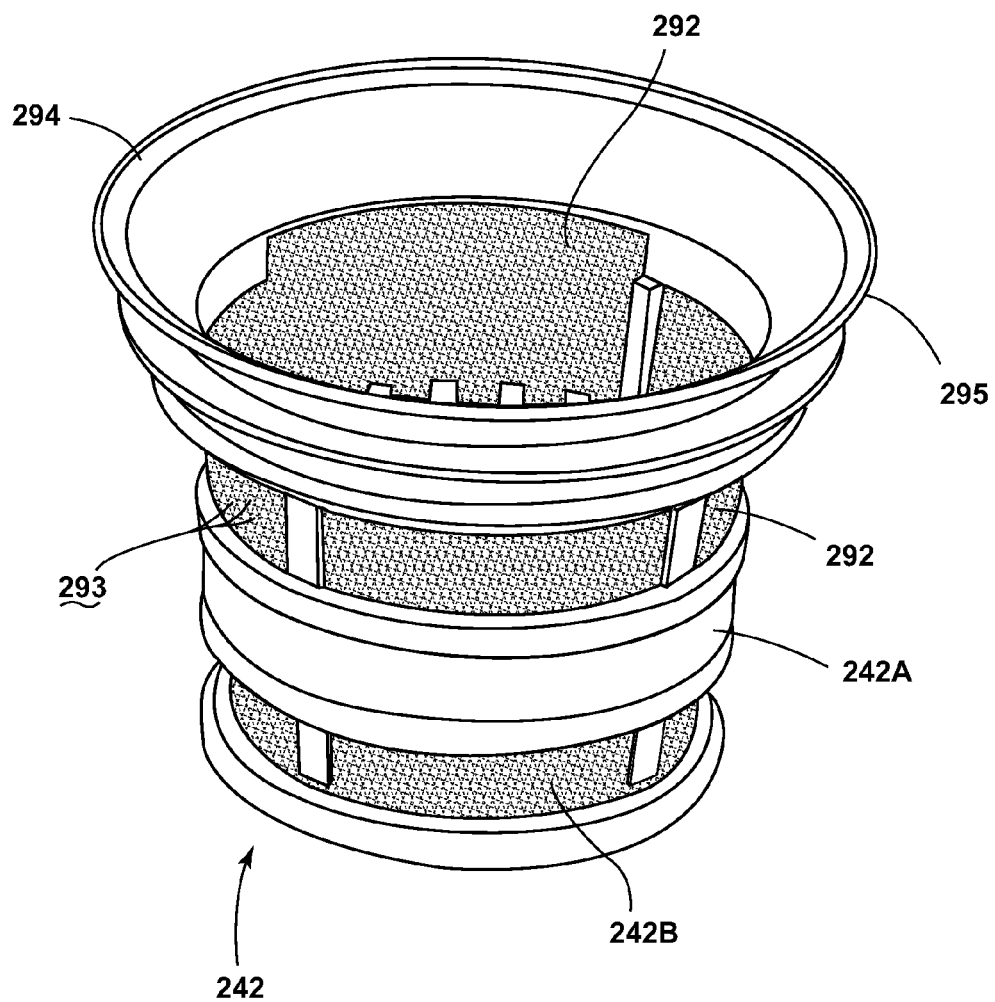
FIG. 22 is a top perspective view of one embodiment of a juicing basket according to the present disclosure.

One embodiment of a cutter disk 226 is shown in FIGS. 20 and 21. In the embodiment depicted in FIGS. 20 and 21, the cutter disk 226 includes a central hole 227 therethrough and a removable cutter blade 230. The central hole 227 is preferably adapted for engagement with the auger 202 when installed in the juicing assembly 100. The cutter disk 226 and cutter blade 230 can be disposed at the same end of the auger 202 as the bevel gear 254 or at the opposite end of the auger 202 as the bevel gear 254. The cutter disk 226 and cutter blade 230 are positioned to cut food prior to the food reaching the auger 202, allowing for the insertion of whole foods or larger foods than would otherwise be permitted. Pre-cutting the food reduces the chances that large food chunks will block the auger 202 from rotating as desired.

The embodiment of the cutter disk 226 shown in FIGS. 20 and 21 includes a screw-type arrangement, wherein a surface 282 includes an offset plane 283 along a ridge 284. An outer diameter 286 of the cutter disk 226 includes a bevel or chamfered edge 288 for a reduced gap between the disk 226 and the main housing 116, when assembled. Additionally, where the cutter blade 230 is removable, as shown in the embodiment depicted in FIGS. 20 and 21, fastener holes 290 are provided through the blade 230 of the cutter disk 226 to permit the user to affix the cutter blade 230 to the cutter disk 226. Corresponding holes (not shown) are provided through the cutter disk 226 to allow fasteners (not shown) to be inserted to fasten the cutter blade 230 to the cutter disk 226. Alternatively, the blade 230 may be permanently affixed with the cutter disk 226 to create a single piece disk/blade element.

One embodiment of a juicing basket 242 for use in the present juicer assembly 110 is shown in FIGS. 22-24A. The juicing basket 242 is sized to be disposed within the cavity 121 of the main housing 116, and has at least one perforated screen 292 about its circumference with a plurality of apertures 293 therethrough. The apertures 293 are optionally of varying sizes, with apertures 293 increasing in size from top-to-bottom or vice versa. The apertures 293 can also vary in size about the circumference of the juicing basket 242. Alternatively, the juicing basket 242 may be comprised of a plurality of perforated screens 292, with each screen having perforations 293 of a different size. The variation in size of apertures 293 can be used to create a plurality of juicing zones 242A, 242B within the juicing basket 242, with apertures 293 of first size or within a first size range making up a first juicing zone 242A, and apertures 293 of a second size or within a second size range making up a second juicing zone 242B. Juicing zones 242A, 242B can be arranged about the circumference of the juicing basket 242 or along the length of the juicing basket 242. Smaller apertures 293 result in smaller finer pulp 144, while larger apertures 293 result in larger pulp 144. In one preferred embodiments, the smaller apertures 293 are about 800 microns in diameter, and the larger apertures 293 are about 1750 microns in diameter.

As best shown in the embodiment depicted in FIGS. 24 and 24A, a wide flair rim funnel 294 is disposed about a top end 295 of the juicing basket 242. The wide flair rim funnel 294 includes a downwardly depending leg 296 which is disposed radially outwardly from a notch 297. The notch 297 is sized to receive an upper edge 299 of the perforated screen 292. A circumferential space 298 is disposed between the screen 292 and the downwardly depending leg 296, and the circumferential space 298 accommodates a top edge 301 of a plate 300. The plate 300 is configured to block at least a portion of the screen 292, e.g., at least one of the juicing zones 242A, 242B to create a desired juice-to-pulp ratio and desired pulp-size distribution. The plate 300 can be rotated manually by the user, or can be controlled electronically to move it from one juicing zone 242A to another juicing zone 242B. In the embodiment depicted in FIGS. 23 and 24, the plate 300 also includes apertures 303, through which pulp 144 can pass. In alternate embodiments, the plate 300 can be positioned radially inwardly from the perforated screen 292.

Figure 25:
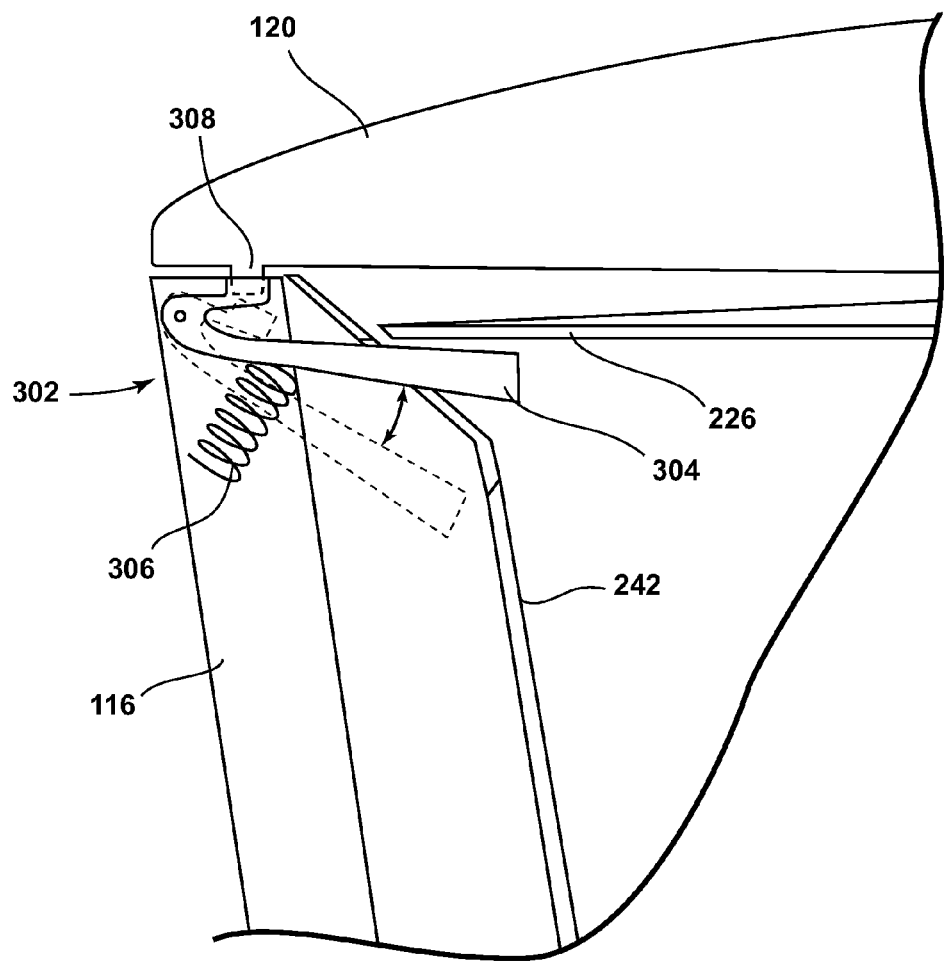
FIG. 25 is a side plan view of one embodiment of an interlocking mechanism according to the present disclosure.

Turning to FIG. 25, an embodiment of an interlock mechanism 302 is disclosed. The interlock mechanism 302 is configured within the main housing 116 to prevent the cutter disk 226 and the juicing basket 242 from rotating when the lid 120 is not engaged with the main housing 116. Specifically, the exemplary interlock mechanism 302 includes a lever 304 that is biased by a spring 306 to engage the cutter disk 226 and the juicing basket 242 to prevent the cutter disk 226 and juicing basket 242 from rotating. A pin 308 is disposed in the lid 120, extending downwardly therefrom. When the lid 120 is engaged with the main housing 116, the pin 308 engages the lever 304, which pushes the lever 304 against the spring 306 and away from the rotating cutter disk 226 and juicing basket 242 in the juicing assembly 110, allowing the components to freely rotate.

Figure 26:
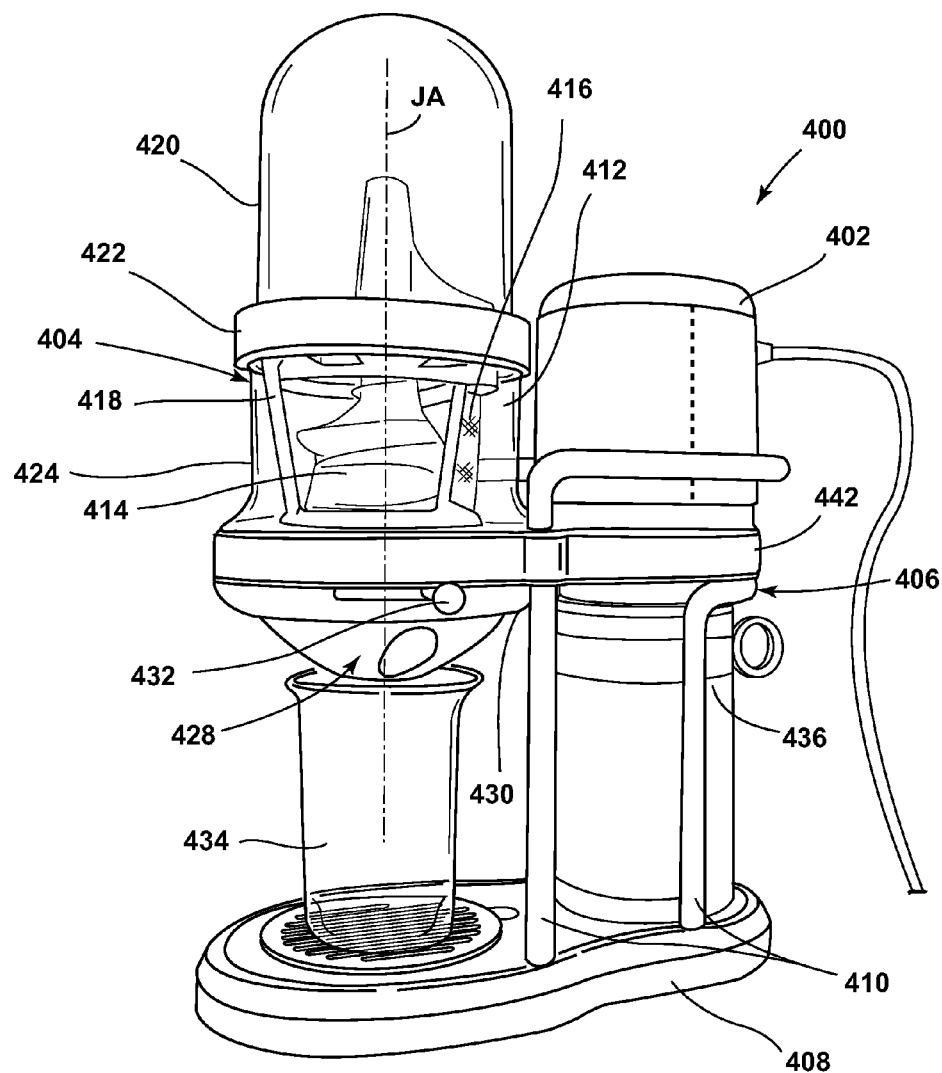
FIG. 26 is a front perspective view of another embodiment of a juicing system according to the present disclosure.
Figure 27:
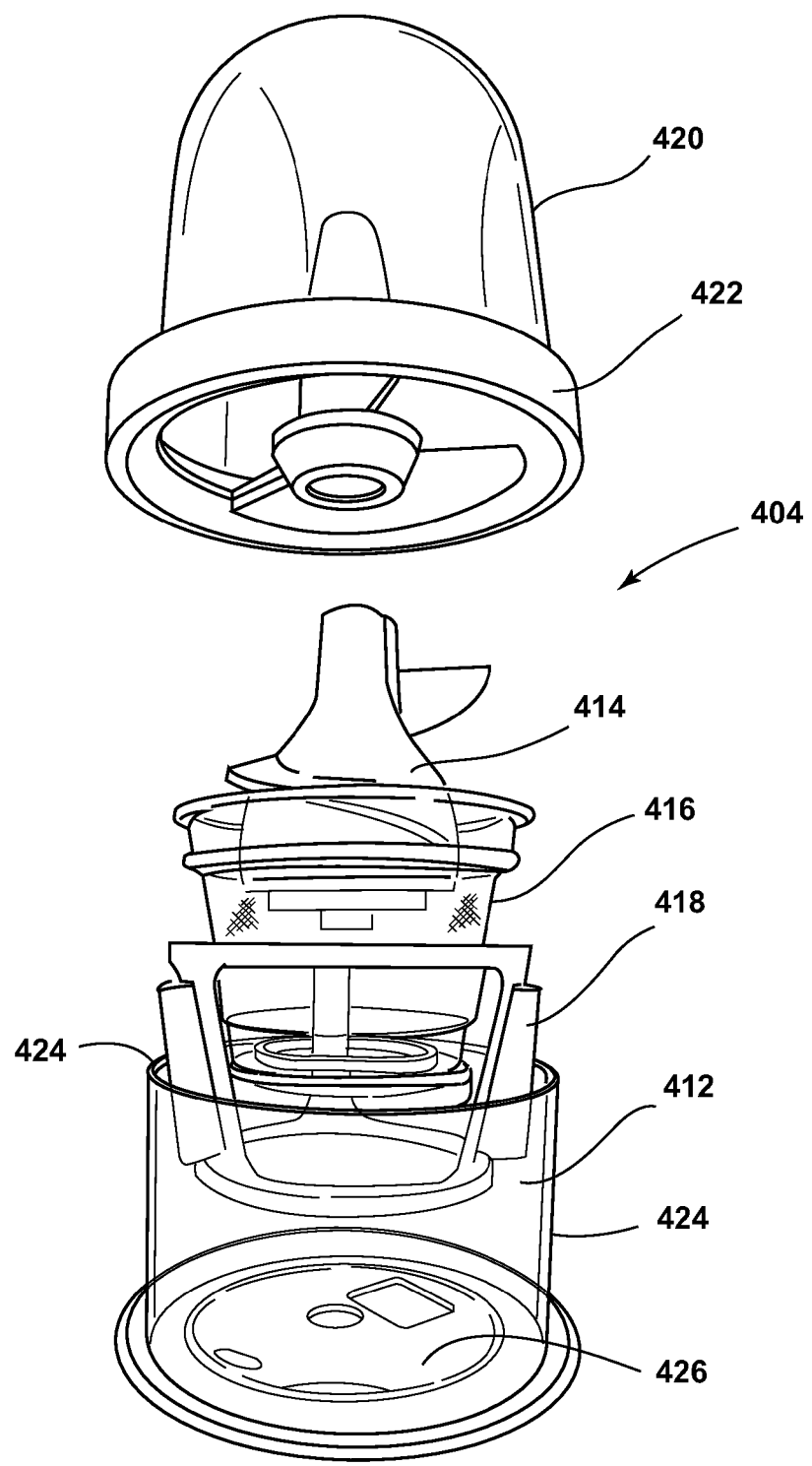
FIG. 27 is a front perspective, partially disassembled view of a juicing assembly for use in the juicing system shown in FIG. 26.
Figure 28:
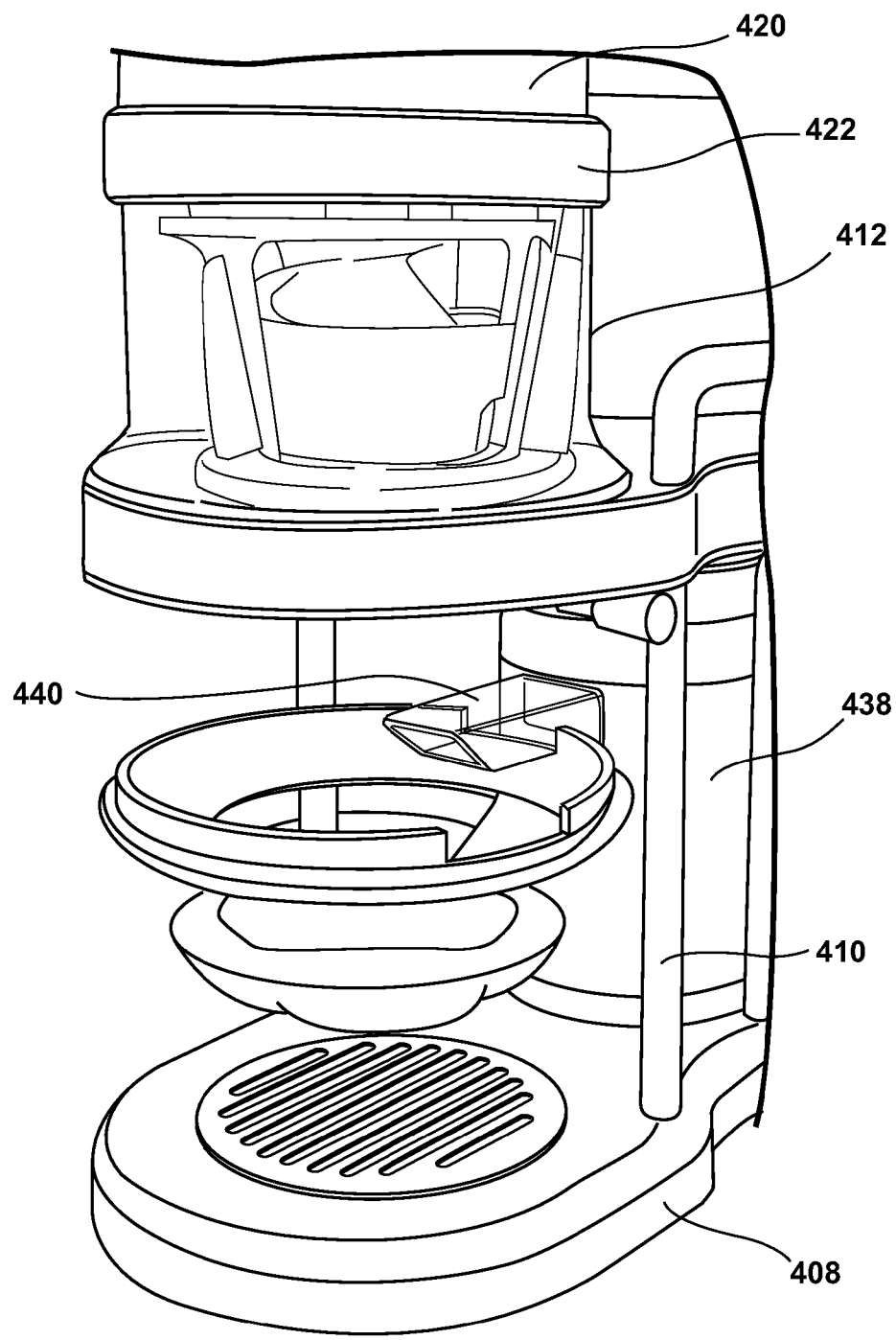
FIG. 28 is a front perspective view of another embodiment of a juicing system according to the present disclosure.

The embodiment of a juicing system 400 shown in FIGS. 26-28 is a stand-alone juicing system 400. The juicing system 400 includes a drive mechanism 402 configured to transmit torque through a transmission unit 404 to an auger 406. The juicing system 400 includes a food pod 408 having a pod lid 410. The One embodiment of a stand-alone juicing system 400 is shown in FIGS. 26-28. The alternative stand-alone juicing system 400 includes a drive mechanism 402 and a juicing assembly 404, which are configured on a stand 406 having a base 408 and a support structure 410 to locate and support the drive mechanism 402 and juicing assembly 404. The juicing assembly 404 includes a main housing 412 with an auger 414 and an adjustable juicing basket 416 configured therein. A wiper 418 is also optionally provided within the main housing 412. The juicing system 400 further includes a food pod 420 with a pod lid 422 that is adapted for connection to a top edge 424 of the housing 412. The main housing 412 includes a peripheral wall 424 and a base 426. In the embodiment depicted in FIGS. 26-28, the auger 414 is generally aligned along a juicing axis JA in the center of the housing 412. The juicing basket 416 is positioned radially outwardly from the auger 414, between the auger 414 and the peripheral wall 424 of the main housing 416. The wiper 418 is disposed radially outwardly from the juicing basket 416, between the juicing basket 416 and the peripheral wall 424. A juice spout 428 and a pulp spout 430 are configured at the base 426 of the main housing 416, for removal of juice and pulp from the main housing 412 following extraction from foods. The juice spout 428 optionally includes a valve 432 to control the flow of juice from the housing 412, and preferably allows the juice to be emptied into a juice container 434. The pulp spout 430 empties the pulp into a pulp container 436 or optionally a pulp breaker 438 as shown in FIG. 28. The pulp breaker 438 includes an outlet 440, to allow processed pulp to be ejected. The drive mechanism 402 is configured to transmit torque through a transmission unit 442 to the auger 414 in the juicing assembly 404, as described in greater detail above.

It will be appreciated that the system and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples.

Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the disclosure and that the method and apparatus within the scope of these claims and their equivalents be covered thereby. In sum, it should be understood that the disclosure is capable of modification and variation and is limited only by the following claims.

What is claimed is:

1. A juicing system, comprising:
 a drive mechanism;
 a juicer assembly operably coupled to the drive mechanism and having a main housing defining a cavity with a peripheral wall surrounding the cavity;
 a lid which encloses a top portion of the cavity, wherein the lid has an opening therethrough which is operably connected with the cavity;
 an auger disposed within the cavity and aligned along a juicing axis;
 a juicing basket disposed within the cavity and positioned radially outwardly from the auger and inwardly from the peripheral wall, wherein the juicing basket has at least one screen with apertures therethrough, such that the juicing basket includes a first juicing zone with apertures of a first size and a second juicing zone with apertures of a second size; and
 a plate disposed about a circumference of the juicing basket, wherein the plate is configured to block at least a portion of the first juicing zone or the second juicing zone, thereby controlling the size of the apertures in the juicing basket available for juicing.

2. The juicing system of claim 1, wherein the plate is configured for manual rotation about the circumference of the juicing basket to block the desired juicing zones.

3. The juicing system of claim 1, wherein the plate is configured for electronic rotation about the circumference of the juicing basket to block the desired juicing zones based on a user input regarding desired juice characteristics.

4. The juicing system of claim 1, wherein the plate is positioned radially outwardly from the screen.

5. The juicing system of claim 1, wherein the plate is positioned radially inwardly from the screen.

6. The juicing system of claim 1, further comprising a wiper disposed radially outwardly from the juicing basket, between the juicing basket and the peripheral wall of the main housing, wherein the wiper is configured to remove material from the screen.

7. A juicing system, comprising:
- a drive mechanism;
- a juicer assembly operably coupled to the drive mechanism and having a main housing defining a cavity;
- a lid which encloses a top portion of the cavity, wherein the lid has an opening therethrough which is operably connected with the cavity;
- a feed chute which is fluidly connected with the opening in the lid, wherein the feed chute is configured to allow introduction of whole foods into the cavity;
- a food pusher which fits within the feed chute, wherein the food pusher includes a second passageway therethrough for the introduction of food items, wherein the feed chute has a larger diameter than the second passageway;
- an auger disposed within the cavity and having a top portion and a bottom portion, wherein the auger is operably connected at one of the top portion or the bottom portion to the drive mechanism to rotate the auger along a generally vertical juicing axis, wherein the drive mechanism is configured to transmit torque to the auger through a shaft which rotates along a horizontal axis;
- a rotatable cutting blade disposed on a cutting disk at the top portion of the auger, wherein the rotatable cutting blade is configured to cut foods inserted into the cavity through the opening in the lid;
- a juicing basket disposed within the cavity and positioned radially outwardly from the auger, wherein the juicing basket has at least one screen with apertures therethrough of varying sizes, and wherein the apertures are arranged into a first juicing zone and a second juicing zone, where the first juicing zone allows a first composition of juice and pulp to pass through and the second juicing zone allows a second composition of juice and pulp to pass through; and
- a plate disposed about a circumference of the juicing basket, wherein the plate is configured to block at least a portion of the first juicing zone or the second juicing zone.

8. The juicing system of claim 7, wherein the drive mechanism is a stand-mixer.

* * * * *